United States Patent
Gong et al.

(10) Patent No.: US 9,858,308 B2
(45) Date of Patent: Jan. 2, 2018

(54) REAL-TIME CONTENT RECOMMENDATION SYSTEM

(71) Applicant: Google Inc., Mountain View, CA (US)

(72) Inventors: Xiaohong Gong, Sunnyvale, CA (US); Wei Zhang, Fremont, CA (US); Nima Asgharbeygi, Mountain View, CA (US)

(73) Assignee: Google LLC, Mountain View, CA (US)

(*) Notice: Subject to any disclaimer, the term of this patent is extended or adjusted under 35 U.S.C. 154(b) by 355 days.

(21) Appl. No.: 14/599,026

(22) Filed: Jan. 16, 2015

(65) Prior Publication Data
US 2016/0210321 A1 Jul. 21, 2016

(51) Int. Cl.
*G06F 7/00* (2006.01)
*G06F 17/30* (2006.01)
*H04L 29/08* (2006.01)
*G06Q 30/06* (2012.01)
*H04N 21/466* (2011.01)

(52) U.S. Cl.
CPC .. *G06F 17/30345* (2013.01); *G06F 17/30386* (2013.01); *G06F 17/30867* (2013.01); *G06Q 30/0631* (2013.01); *H04L 67/30* (2013.01); *H04L 67/306* (2013.01); *H04N 21/4668* (2013.01)

(58) Field of Classification Search
CPC ......... G06F 17/30345; G06F 17/30867; G06F 17/30386; G06F 21/316; G06F 2203/011; G06F 17/30781; H04N 21/4668; H04L 67/306; H04L 67/30
USPC .. 707/727, 754, 748.737, 748, 737, 999.006
See application file for complete search history.

(56) References Cited

U.S. PATENT DOCUMENTS

| 7,340,460 B1* | 3/2008 | Kapur | G06F 17/30696 |
| 7,895,519 B1* | 2/2011 | Allegrezza | G06F 9/4446 715/705 |
| 8,250,065 B1* | 8/2012 | Chambers | G06F 17/30873 707/723 |

(Continued)

OTHER PUBLICATIONS

Li, Jia and Zaiane, Osmar. Combining Usage, Content, and Structure Data to Improve Web Site Recommendation, Ecommerce and Web Technologies Lecture Notes in Computer Science, vol. 3182, pp. 305-315, Springer, 2004.

(Continued)

*Primary Examiner* — Mohammed R Uddin
(74) *Attorney, Agent, or Firm* — Foley & Lardner LLP

(57) ABSTRACT

System and methods of this disclosure are directed to recommending content in real-time or near real-time. The system comprises a number of pipelines updated a different frequencies that process temporally different sets of web property visit data. Within each pipeline, the system can employ different number of algorithms to process visit data to generate content recommendations. One algorithm is a content filter that filters from the visit data those determined to be unsuitable as recommendations. Another is a content analyzer that analyzes the content of each URL in the visit data by topic category and attribute. Another is an item-to-item collaborative filter that determines a correlation score for each URL based on those in the visit data in a single session Another is a device-to-item matrix factorization that determines an affinity score for each URL based on visit data, context information, and topic category.

20 Claims, 15 Drawing Sheets

(56) References Cited

U.S. PATENT DOCUMENTS

| | | | |
|---|---|---|---|
| 8,521,774 B1* | 8/2013 | Cai | G06F 17/30457 707/776 |
| 8,639,636 B2* | 1/2014 | Gibbon | G06Q 30/02 706/6 |
| 8,751,507 B2 | 6/2014 | Kim et al. | |
| 2007/0124209 A1* | 5/2007 | Walker | G06Q 20/105 705/14.25 |
| 2007/0208729 A1* | 9/2007 | Martino | G06F 17/30702 |
| 2008/0222283 A1* | 9/2008 | Ertugrul | G06Q 30/02 709/224 |
| 2009/0006974 A1* | 1/2009 | Harinarayan | G06F 17/30867 715/738 |
| 2009/0327913 A1* | 12/2009 | Adar | G06F 17/30876 715/745 |
| 2010/0161785 A1* | 6/2010 | Xue | G06F 17/30867 709/224 |
| 2011/0050732 A1* | 3/2011 | Arrasvuori | G06F 17/30241 345/666 |
| 2011/0191344 A1* | 8/2011 | Jin | G06F 17/30 707/739 |
| 2011/0231257 A1* | 9/2011 | Winters | G06Q 30/02 705/14.53 |
| 2011/0258033 A1* | 10/2011 | Gollapudi | G06F 17/30893 705/14.42 |
| 2011/0302155 A1* | 12/2011 | Yan | G06F 17/30867 707/723 |
| 2012/0158950 A1* | 6/2012 | Seifert | G06F 17/30861 709/224 |
| 2012/0246671 A1* | 9/2012 | Wilson | G06Q 30/02 725/19 |
| 2013/0159254 A1* | 6/2013 | Chen | G06F 17/30867 707/639 |
| 2013/0204825 A1 | 8/2013 | Su | |
| 2013/0218721 A1* | 8/2013 | Borhan | G06Q 20/322 705/26.41 |
| 2014/0067814 A1* | 3/2014 | Palmert | G06F 17/30598 707/738 |
| 2014/0143655 A1* | 5/2014 | Alon | G06Q 30/0202 715/234 |
| 2014/0149326 A1 | 5/2014 | Kalmes et al. | |
| 2014/0188956 A1 | 7/2014 | Subba et al. | |
| 2016/0092532 A1* | 3/2016 | Jia | H04L 47/726 707/621 |

OTHER PUBLICATIONS

Nguyen, Thi Thanh Sang, et al. Web-page Recommendation based on Web Usage and Domain Knowledge, IEEE Transactions on Knowledge and Data Engineering, vol. 26, No. 10, pp. 2574-2587, Oct. 2014.

Song, Yang, et al. Searchable Web Sites Recommendation, ACM WSDM, Feb. 9-12, 2011 (10 pages).

* cited by examiner

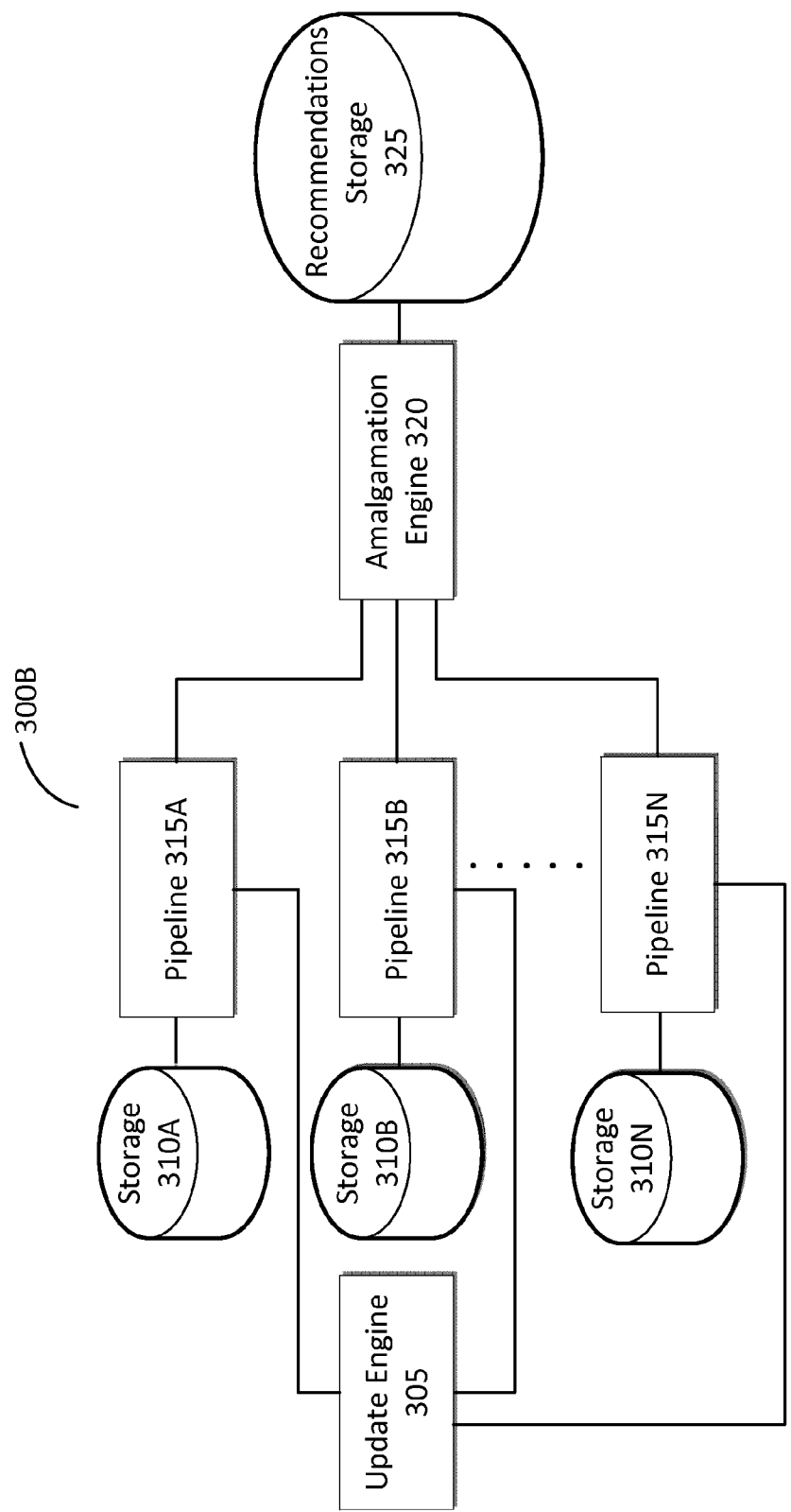

REAL-TIME CONTENT RECOMMENDATION SYSTEM

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a method of providing content recommendations in real-time or near real-time. The method can include a first selection engine executing on a data processing system selecting a first set of content item identifiers from a first database of a content publisher at a first frequency. The method can include an update engine executing on a data processing system updating a first pipeline with the first set of content item identifiers. The method can include a second selection engine executing on the data processing system a second set of content item identifiers from a database of the content publisher at a second frequency. The second database can be different from the first database. The second frequency can be different from the first frequency. The method can include the update engine updating a second pipeline with the second set of content item identifiers. The method can include an amalgamator engine executing on the data processing system producing a combined set of content item identifiers comprising some of the first set of content item identifiers and some of the second set of content item identifiers.

The method of selecting the first set of content item identifiers can include a profile filter module choosing a set of premium profiles from a set of profiles. The method for selecting the first set of content item identifiers can include a content collector module identifying the first set of content item identifiers based on the set of premium profiles.

The method of selecting at least one of the sets of content item identifiers can include a respective content filter module filtering from the respective set of content item identifiers a set of content item identifiers determined to be unsuitable. The method for selecting at least one of the sets of content item identifiers can include a respective content filter module filtering from the respective set of content item identifiers a set of content item identifiers determined to be a homepage, a hub page, or a private page.

The method of selecting at least one of the sets of content item identifiers can include a respective content analysis engine retrieving a respective set of topic categories and a respective set of topic category attributes. The method for selecting at least one of the sets of content item identifiers can include a respective content analysis engine mapping each content item identifier to each other content item identifier in the respective set of content item identifiers based on the respective set of topic categories and the respective set of topic category attributes to generate a categorized respective set of content item identifiers.

The method for selecting at least one of the sets of content item identifiers can include an item-to-item collaborative filter correlating, each content item identifier to each other content item identifier in the categorized respective set of content item identifiers based on a dataset of click through each content item identifier to generate a correlation score and a correlated respective set of content item identifiers. The method can include the item-to-item collaborative filter ranking the correlated respective set of content item identifiers based on the correlation score per content item identifier.

The method can include a third selection engine selecting a third set of content item identifiers from a third database of the content publisher at a third frequency. The third database can be different from the first database and the second database. The third frequency can be different form the first frequency and the second frequency. The method can include the update engine updating a third pipeline with the third set of content item identifiers. The method of selecting the third set of content item identifiers can include the amalgamator engine producing the combined set of content item identifiers comprising some of the first set of content item identifiers, some of the second set of content item identifiers, and some of the third set of content item identifiers.

The method can include a device-to-item matrix factorization module factorizing each content item identifier in the third set of content item identifiers to a set of devices based on a dataset of clicks to generate an affinity score and a factorized set of the respective set of content item identifiers. The method can include the device-to-item matrix factorization module ranking each content item identifier in the factorized set of the third set of content item identifiers based on the affinity score for each content item identifier.

The method can include a combiner module multiplying the correlation score and the affinity score per content item identifier in the third set of content item identifiers. The method can include the combiner module generating a final score for each content item identifier in the third set of content item identifiers.

The method can include a ranker module ranking each content item identifier in the third set of content item identifiers based on a linear regression of the correlation score and the affinity score parameterized by a click feedback set.

The method can include a fourth selection engine selecting a fourth set of content item identifiers from a fourth database of the content publisher at a fourth frequency. The fourth database can be different from the first database, the second database, and the third database.

The fourth frequency can be different form the first frequency, the second frequency, and third frequency. The method can include the update engine updating a fourth pipeline with the fourth set of content item identifiers. The method of selecting the fourth set of content item identifiers can include the amalgamator engine producing the combined set of content item identifiers comprising some of the first set of content item identifiers, some of the second set of content item identifiers, some of the third set of content item identifiers, and some of the fourth set of content item identifiers.

Another aspect is directed to a system for providing recommendations in real-time or near real-time. The system can include a first selection engine executing on a data processing system. The first selection engine can select a first set of content item identifiers from a first database of a content publisher at a first frequency. The system can include a second selection engine executing on a data processing system. The second selection engine can select a second set of content item identifiers from a second database of the content publisher. The second database can be different from the first database. The second frequency can be different from the first frequency. The system can include an update engine executing on the data processing system. The update engine can update a first pipeline with the first set of content item identifiers and a second pipeline with the second set of content item identifiers. The system can include an amalgamation engine executing on a data processing system. The amalgamation engine can produce a combined set of content item identifiers comprising some of the first set of content item identifiers and the second set of content item identifiers.

The system for selecting the first set of content item identifiers can include a profile filter executing on a data processing system. The profile filter can choose a set of premium profiles from a set of profiles. The system for selecting the first set of content item identifiers can include a content collector module executing on a data processing system. The content collector module can identify the first set of content item identifiers based on the set of premium profiles.

The system for selecting at least one of the sets of content item identifiers can include a respective content filter module executing on a data processing system. The respective content filter module can filter from the respective set of content item identifiers a set of content item identifiers determined to be unsuitable. A set of content item identifiers determined to be unsuitable can include a homepage, a hub page, or a private page.

The system for selecting at least one of the sets of content item identifiers can include a respective content analysis engine executing on a data processing system. The respective content analysis engine can retrieve a respective set of topic categories and respective set of topic category attributes. The respective content analysis engine can map each content item identifier to each other content item identifier in the respective set of content item identifiers based on the respective set of topic categories and the respective set of topic category attributes to generate a categorized respective set of content item identifiers.

The system for selecting at least one of the sets of content item identifiers can include an item-to-item collaborative filter. The item-to-item collaborative filter can correlate each content item identifier to each other content item identifier in the categorized respective set of content item identifiers based on a dataset of click through each content item identifier to generate a correlation score and a correlated respective set of content item identifiers. The item-to-item collaborative filter can rank the correlated respective set of content item identifiers based on the correlation score per content item identifier.

The system can include a third selection engine executing on a data processing system. The third selection engine can select a third set of content item identifiers from a third database of the content publisher at a third frequency. The third database can be different from the first database and the second database. The third frequency can be different form the first frequency and the second frequency. The update engine can update a third pipeline with the third set of content item identifiers. The amalgamation engine can produce the combined set of content item identifiers comprising some of the first set of content item identifiers, some of the second set of content item identifiers, and some of the third set of content item identifiers.

The system can include a device-to-item matrix factorization module executing on a data processing system. The device-to-item matrix factorization module can factorize each content item identifier in the respective set of content item identifiers to a set of devices based on a dataset of clicks to generate an affinity score and a factorized set of the respective set of content item identifiers. The device-to-item matrix factorization module can further rank each content item identifier in the factorized respective set of content item identifiers based on the affinity score for each content item identifier.

The system can include a combiner module executing on a data processing system. The combiner module can multiply the correlation score and the affinity score per content item identifier in the third set of content item identifiers. The combiner module can generate a final score for each content item identifier in the third set of content item identifiers.

The system can include a ranker module executing on a data processing system. The ranker module can rank each content item identifier in the third set of content item identifiers based on a linear regression of the correlation score and the affinity score parameterized by a click feedback set.

The system can include a fourth selection engine executing on a data processing system. The fourth selection engine can select a fourth set of content item identifiers from a fourth database of the content publisher at a fourth frequency. The fourth database can be different from the first database, the second database, and third database. The fourth frequency can be different form the first frequency, the second frequency, and the third database. The update engine can update a fourth pipeline with the fourth set of content item identifiers. The amalgamation engine can produce the combined set of content item identifiers comprising some of the first set of content item identifiers, some of the second set of content item identifiers, some of the third set of content item identifiers, and some of the fourth set of content item identifiers.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3B is an illustration of a system for recommending content items in real-time or near real-time with N pipelines in accordance with an implementation.

Like reference numbers and designations in the various drawings indicate like elements.

DETAILED DESCRIPTION

The systems and methods described herein relate to recommending content items from a content publisher in real-time or near real-time. A data processing system can use web property visit data to generate content recommendations in real-time or near real-time by using a number of pipelines that retrieve visit data from various periods of time at various frequencies and apply a number of algorithms.

In one implementation, the system can have four different pipelines to process at different temporal intervals temporally different sets of visit history data for a particular content publisher's website and recommend content from the particular content publisher's website to the user. For example, the first pipeline can update at a frequency and process web property visit data from the short term to generate near real-time content recommendations. The second pipeline can update at a frequency less than the first pipeline and process web property visit data from the short term to generate near real-time content recommendations. The third pipeline can update at a frequency less than the second pipeline and process web property visit data from the long term to generate near real-time content recommendations. The fourth pipeline can update at a frequency less than the third pipeline and process web property visit data from the long term to generate near real-time content recommendations. Each pipeline can use different algorithms to generate content recommendations. The system can be implemented using a different number of pipelines other than four.

Figure 1:
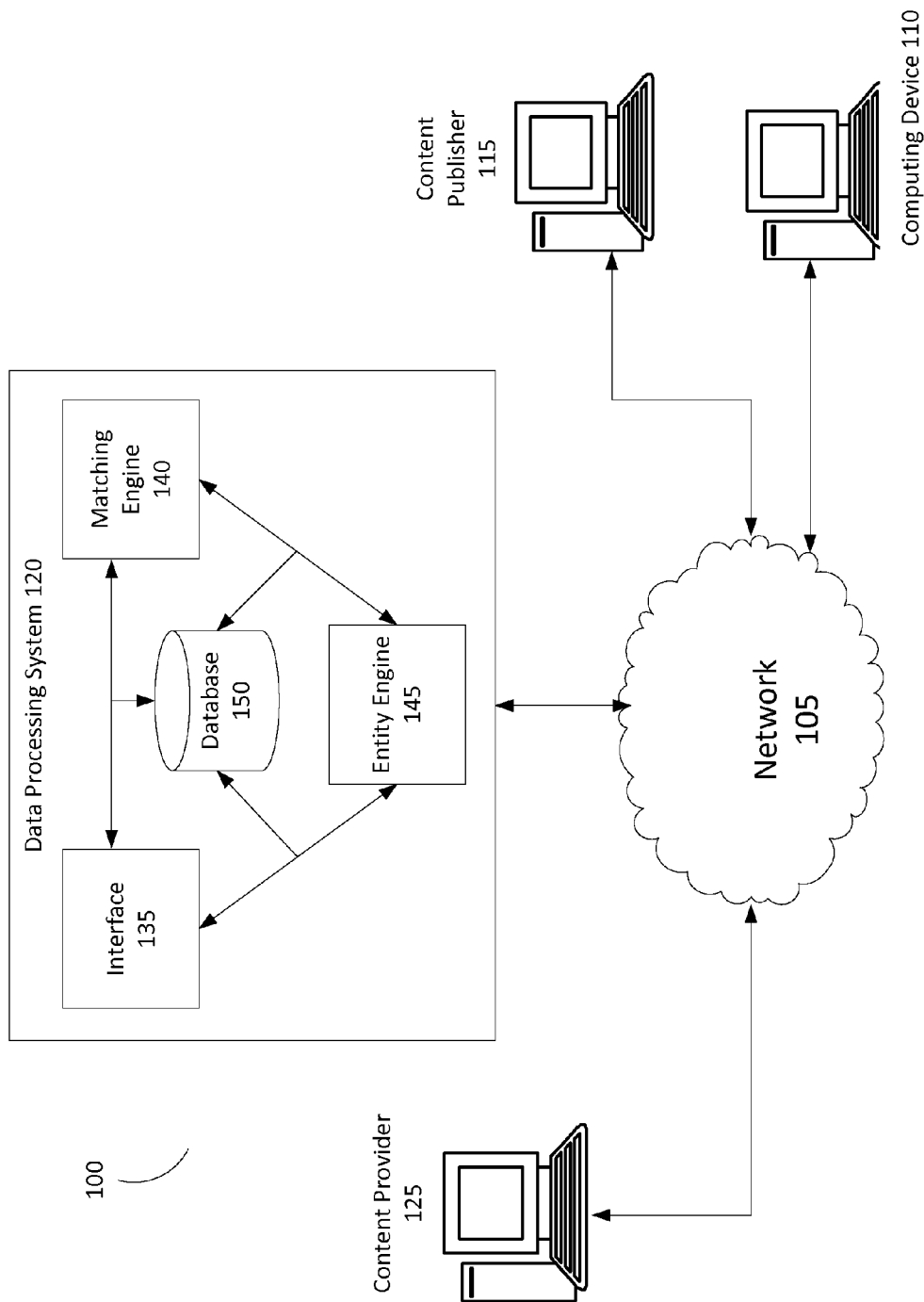
FIG. 1 is an illustration of a system for recommending content items in real-time or near real-time in accordance with an implementation.

FIG. 1 illustrates an example system 100 for recommending content items from a content publisher in real-time or near real-time. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 can be any type or form of network and can include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 can include a wireless link, such as an infrared channel or satellite band. The topology of the network 105 can include a bus, star, or ring network topology. The network can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data can be transmitted via different protocols, or the same types of data can be transmitted via different protocols.

The system 100 can include at least one data processing system 120. The data processing system 120 can include at least one logic device such as a computing device having a processor to communicate via the network 105, for example with the computing device 110, the web site operator or content publisher 115, and at least one content provider 125. The data processing system 120 can include at least one server. For example, the data processing system 120 can include a plurality of servers located in at least one data center. The data processing system 120 can include multiple, logically-grouped servers and facilitate distributed computing techniques. The logical group of servers can be referred to as a server farm or a machine farm. The servers can also be geographically dispersed. A machine farm can be administered as a single entity, or the machine farm can include a plurality of machine farms. The servers within each machine farm can be heterogeneous—one or more of the servers or machines can operate according to one type of operating system platform.

Servers in the machine farm can be stored in high-density rack systems, along with associated storage systems, and located in an enterprise data center. For example, consolidating the servers in this way can improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one interface 135, at least one matching engine 140, at least one entity engine 145 and at least one database 150. The interface 135, matching engine 140, and entity engine 145 can each include at least one processing unit or other logic device such as programmable logic array engine, or module configured to communicate with the database 150. The interface 135, matching engine 140, and entity engine 145 can be separate components, a single component, or part of the data processing system 120. The system 100 and its components, such as a data processing system, can include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 can be associated with a unique identifier (e.g., a cookie).

For situations in which the systems discussed here collect personal information about users, or can make use of personal information, the users can be provided with an opportunity to control whether programs or features that can collect personal information (e.g., information about a user's social network, social actions or activities, a user's preferences, or a user's current location), or to control whether or how to receive content from the content server that can be more relevant to the user. In addition, certain data can be treated in one or more ways before it is stored or used, so that certain information about the user is removed when generating parameters (e.g., demographic parameters). For example, a user's identity can be treated so that no identifying information can be determined for the user, or a user's geographic location can be generalized where location information is obtained (such as to a city, ZIP code, or state level), so that a particular location of a user cannot be determined. Thus, the user can have control over how information is collected about the user and used by a content server.

The data processing system 120 can receive a request for content. The request can include a query such as a search query input into a search engine. The input query can include text, characters, symbols, etc. The data processing system 120 can receive the input query from a computing device 110 via network 105. In some implementations, the input query can include audio (e.g., words spoken by a user of the computing device 110 and input into the search engine of the data processing system via network 105 and interface 135).

Responsive to the search query or other request for content, the data processing system can identify, select or otherwise obtain content to be provided or presented via the computing device 110 making the request, or some other computing device 110 associated with the request for content. The content can include, e.g., text, characters, symbols, images, video, audio, or multimedia content. The data processing system 120 can receive the request from a computing device such as, e.g., computing device 110. For example, the data processing system 120 can receive the request via an application executing on the computing device 110, such as a mobile application executing on a mobile device (e.g., smart phone or tablet) can make a request for content. In some instances, a web page can request content from the data processing system 120 responsive to a user of a mobile device 110 visiting the web page (e.g., via a mobile device 110).

The request for content can include information that facilitates content selection. In some implementations, the data processing system 120 can request information from the computing device 110 to facilitate identifying content or content selection. The data processing system 120 can request or obtain information responsive to receiving a request for content from the computing device 110. The information can include information about displaying the content on the computing device 110 (e.g., a content slot size or position) or available resources of computing device 110 to display or otherwise manipulate the content.

The data processing system 120 can include an interface 135 designed and constructed to receive, access, obtain, transmit, convey or otherwise communicate with one or more component of the data processing system 120 or device (e.g., content provider 125, content publisher 115 and computing device 110) via network 105. In some implementations, the interface module 135 is configured to receive a search query provided via a user device 110. The search query can be input into a search engine of, associated with, or otherwise communicatively coupled to data processing system 120. The data processing system 120 can store the search query in a database 150 for later processing. In some implementations, the data processing system 120 provides or otherwise conveys the search query to the matching engine 140 for further processing. The interface module 135 can receive content selection criteria information from a content provider 125 and stores this information in a database 150 or otherwise transmits or conveys the information to one or more component of the data processing system 120 for further processing.

Figure 2:
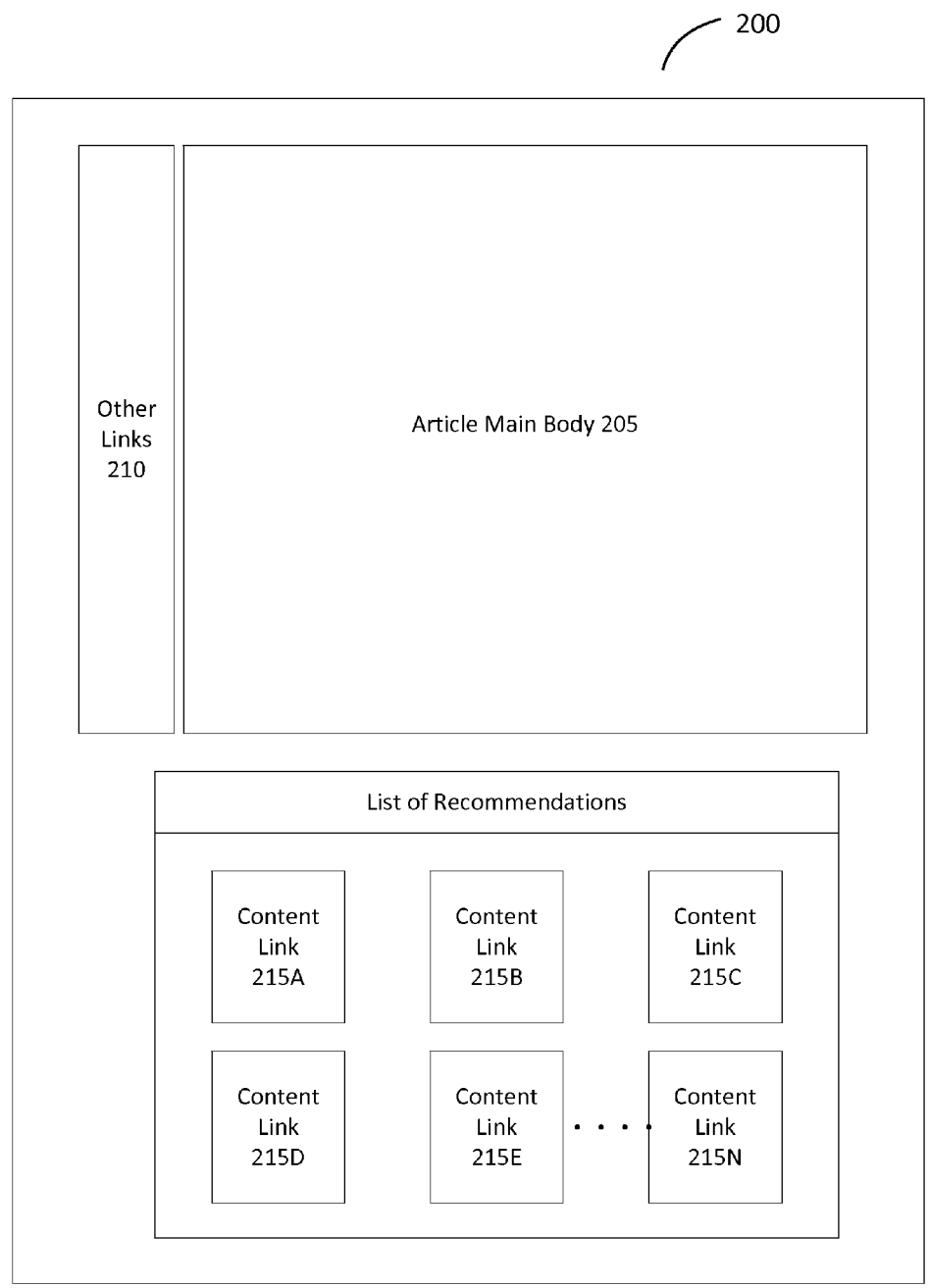
FIG. 2 is an illustration of a graphical user interface of an online document in accordance with an implementation.

The interface 135 can be further designed and constructed to provide, generate, transmit, or otherwise present a graphical user interface via the computing device 110, such as the exemplary online document interface illustrated in FIG. 2.

The data processing system 120 can include a database 150. The database 150 can store information that facilitates generation content for a content publisher recommendations in real-time or near real-time. For example, the database 150 can be designed and constructed to store the information in one or more data structures in memory, storage, or a hard drive. The database 150 can be stored on the data processing system 120, or can be stored in another location, but be accessible to the data processing system 120 via network 105.

FIG. 2 is an illustration of an exemplary graphical user interface of a system for recommending content for a content publisher in real-time or near real-time according to an implementation. The online document 200 can be displayed via a web browser on a computing device. The online document 200 can be displayed via an application executing on a computing device, such as a mobile app running on a smart phone. The online document 200 can include an article main body 205. The online document can additionally include a list of other links 210. Other links 210 can include links to content from other online documents of the website and links to content from other content publishers or content providers. Content from other content publishers or content providers can include online documents, such as webpages, video, or audio.

The data processing system 120 or any of the one or more components of the system 100 can provide the online document 200. The data processing system 120 or any one or more components of the system 100 can also provide other links 210. The data processing system can 120 or any one or more components of the system 100 can provide the content links 215A-N. Responsive to receiving a click on one of the other links 210, the data processing system 120 can direct the web browser or application to the content indicated by the link. For example, if one of the other links 210 is labeled "sports" and the respective link is clicked, the data processing system 120 can direct the web browser or the application to the sports page of the website or application indicated by the other link 210. In addition, responsive to receiving a click on one of the content links 215A-N under the list of recommendation, the data processing system 120 or any of the one or more components of the system 100 can direct the web browser or application to load another online document indicated by the content link. For example, if the content link 215A is clicked, the data processing system 210 or any of the one or more components of the system 100 can direct the web browser or the application to the web page of the content publisher to the web page indicated by the content link 215A.

Figure 3A:
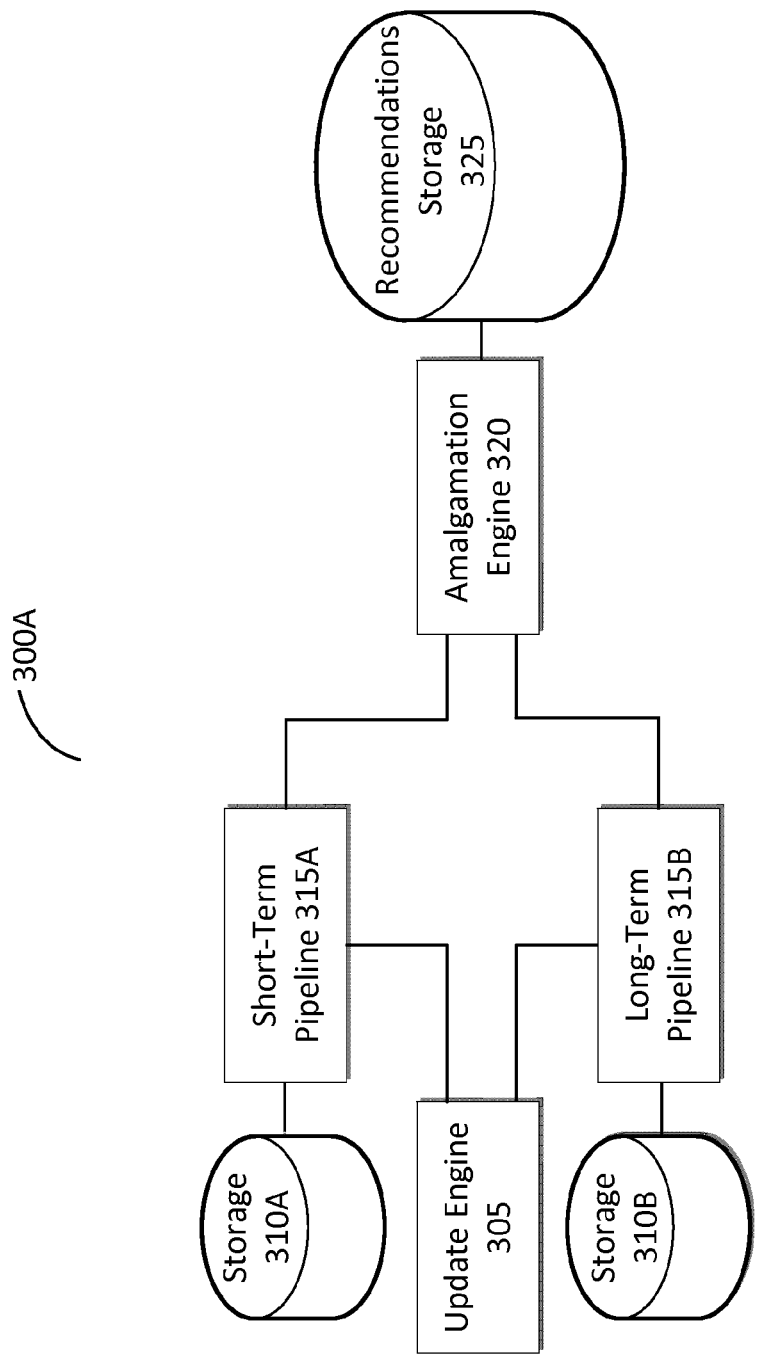
FIG. 3A is an illustration of a system for recommending content items in real-time or near real-time with two pipelines in accordance with an implementation.

FIG. 3A shows an illustration of a system for recommending content in real-time or near near-time according to an implementation. The recommendation system 300A can be performed by the data processing system 120 or any of the one or more components of the system 100. The recommendations system 300A can comprise an update engine 305, database storages 310A and 310B, a short-term pipeline 315A, a long-term pipeline 315B, an amalgamation engine 320, and a recommendations storage 325.

The update engine 305 can be configured to update the short-term pipeline 315A and long-term pipeline 315B at various frequencies. The various frequencies can be based on time interval, counter, fulfillment of a condition, or the number of visits, or any combination thereof. The update engine 305 can be configured to update the short-term pipeline 315A at any time interval from a second to hours and update the long-term pipeline 315B at any time interval from hours to days, weeks, or months. The update engine 305 can be configured to update the short-term pipeline 315A or the long-term pipeline 315B based upon a counter reaching a predetermined number. For example, the update engine 305 can be configured to update the short-term pipeline 315A when the counter reaches 1,000 and update the long-term pipeline 315B when the counter reaches 100,000. The update engine 305 can be configured to update the short-term pipeline 315A or long-term pipeline 315B upon the fulfillment of a condition. For example, the update engine 305 can be configured to update the short-term pipeline 315A and the long-term pipeline 315B upon the publication of an online document on the content publisher's website. The update engine 305 can be configured to update the short-term pipeline 315A or long-term pipeline 315B upon reaching a threshold number of visits of the online document. For example, the update engine 305 can be configured to update the short-term pipeline 315A when the number of visits reaches 1,000 and update the long-term pipeline 315B when the number of visits reaches 10,000. The various frequencies can be stored in and adjusted by any one or more of the components in the system 100.

When being updated, the short-term pipeline 315A and the long-term pipeline 315B can be configured to retrieve web property visit data from the content publisher's website or application from the respective database storages 310A or 310B. The web property visit data can comprise server logs created and maintained by any of the one or more of the components in system 100 that indicate the visits or activities on the one or more components in the system 100, such as a web server of the content provider 125 or content publisher 115. The web property visit data can include the URLs visited on the website by users. The web property visit data can include any content item identifier of a webpage visited. The content item identifier can correspond to a webpage or any set of webpages or URLs. For example, the content item identifier can identify a set of URLs that refer to the same online document but have different syntax such as the query or fragments within the URL string. The web property visit data can include a list of profiles that include URLs or content item identifiers visited by the profile. The short-term pipeline 315A and long-term pipeline 315B can be configured to implement any number of algorithms, including those depicted in FIGS. 4-12 and described herein.

The database storages 310A and 310B can be configured to contain web property visit data from different time periods. The different time periods can overlap. For example, database 310A can be from the past 30 minutes to 2 days and database 310B can be from past hour to 3 days. The type of web property visit data contained in database storages 310A and 310B can be different. For example, database storage 310A can contain a list of profiles and 310B can be configured to contain URLs or content item identifiers visited. The database storages 310A and 310B can be configured to be part of the one, same module that contains web property visit data from the different time periods. For example, the database storages 310A and 310B can be one database of web property visit data such as database 150 of the system 100 and the pipelines 315A and 315B retrieve the web property visit data from different time periods.

The amalgamation engine 320 engine can be configured to retrieve content recommendations generated by the short-term pipeline 315A and the long-term pipeline 315B to provide to the recommendations storage 325. The amalgamation engine 320 can be configured to retrieve the content recommendations at various frequency. The various frequencies can be based on time interval, counter, fulfillment of a condition, or the number of visits, or any combination thereof. For example, the amalgamation engine 320 can be configured to retrieve content recommendations at the same frequency as the update engine 305 updates pipeline 315A or 315B. The amalgamation engine 320 can be configured to retrieve the content recommendations at a frequency independent of the update engine 305 updating pipeline 315A or 315B. The amalgamation engine 320 can be configured to retrieve the content recommendations whenever an online document is visited. The amalgamation engine 320 can be configured to retrieve the content recommendations upon fulfilling a condition, such as publication of an online document on a website. The amalgamation engine 320 can be configured to retrieve the content recommendations upon reaching a threshold number of visits on the online document. The amalgamation engine 320 can be configured to send content recommendations to the recommendations storage 325.

The recommendations storage 325 can be configured to store content recommendations provided by the amalgamation engine 325 for the list of recommendations 215A-N in the online document 200 displayed on the computing device 110. The recommendations storage 325 can be configured to retrieve content recommendations at any frequency from the amalgamation engine 320. The frequencies can be based on time interval, counter, fulfillment of a condition, or the number of visits, or any combination thereof. For example, the recommendation storage 325 can be configured to retrieve content recommendations at a frequency independent of the amalgamation engine 320 or the update engine 305 updating any one of the pipelines 315A and 315B. The recommendations storage 325 can be configured to retrieve the content recommendations whenever an online document is visited. The recommendations storage 325 can be configured to retrieve the content recommendations upon fulfilling a condition, such as the publication of an online document on the website. The recommendations storage 325 can be configured to retrieve the content recommendation upon reaching a threshold number of visits of the online document.

FIG. 3B shows an illustration of a system for recommending content from a content publisher in real-time or near real-time. The recommendation system 300B can be performed by the data processing system 120 or any of the one or more components of the system 100. The recommendation system 300B can comprise an update engine 305, any number of database storage 310A-N, any number of pipelines 315A-N, an amalgamation engine 320, and a recommendation storage 325.

The update engine 305 can be configured to update the pipelines 315A-N at various frequencies. The various frequencies can be based on time interval, counter, fulfillment of a condition, or the number of visits, or any combination thereof. The update engine 305 can be configured to update pipeline 315A-N at any time interval from seconds, minutes, hours, days, weeks, or months. The update engine 305 can be configured to update the any of the pipelines 315A-N based upon a counter reaching a predetermined number. For example, the update engine 305 can be configured to update any one of the pipelines 315A-N when the counter reaches 10,000. The update engine 305 can be configured to update any one of the pipelines 315A-N upon the fulfillment of a condition. For example, the update engine 305 can be configured to update any one of the pipelines 315A-N upon the publication of an online document on a website. The update engine 305 can be configured to update any of the pipelines 315A-N reaching a threshold number of visits of the online document. For example, update engine 305 can be configured to update any one of the pipelines 315A-N when the number of visits reaches 100,000. The various frequencies can be adjusted by any one or more of the components in system 100. In addition, the update engine 305 can be configured to update each pipeline 315A-N at mutually different frequencies. For example, the mutually different frequencies can be in ascending or descending intervals. In this example, pipeline 315A can be configured to be updated every minute to 30 minutes, pipeline 315B can be updated every 30 minutes to 6 hours, pipeline 315C can be configured to be updated every 6 hours to 8 hours, and pipeline 315D can be updated every 24 hours to a few days.

When being updated, the pipelines 315A-N can be configured to retrieve web property visit data about the content publisher's website or application from the respective database storages 310A-N. The web property visit data can include the URLs visited on the website by users. The web property visit data can include any content item identifier of a webpage visited. The content item identifier can correspond to a webpage or any set of webpages or URLs. The web property visit data can include a list of profiles that include URLS or content item identifiers visited by the profile. The pipelines 315A-N can be configured to implement any number of algorithms, including those depicted in FIGS. 4-12 and described herein.

The database storages 310A-N can be configured to contain web property visit data from different time periods. The different time periods can overlap. For example, database storage 310A can be from the past 3 days, database 310B can be from the past hour, database 310C can be from the past 3 hours, and database 310D can be from the past 5 days. The type of web property visit data contained in each database storage 310A-N can be different. For example, database storage 310A can contain a list of profiles, database 310B can be configured to contain a URLs visited by users, devices, or groups of users or devices, and database 310C and 310D can contain content item identifiers visited. The database storages 310A-310N can be configured to be part of the one, same module that contains web property visit data from the different time periods. For example, the database storages 310A-310N can be one database of web property visit data such as database 150 of the system 100 and the pipelines 315A-315N retrieve the web property visit data from different time periods.

The amalgamation engine 320 can be configured to retrieve content recommendations generated by each of the pipelines 315A-N to provide to the recommendations storage 325. The amalgamation engine 320 can be configured to retrieve the content recommendations at various frequency. The various frequencies can be based on time interval, counter, fulfillment of a condition, or the number of visits, or any combination thereof. For example, the amalgamation engine 320 can be configured to retrieve content recommendations at the same frequency as the update engine 305 updates any one of the pipelines 315A-N. The amalgamation engine 320 can be configured to retrieve the content recommendations at a frequency independent of the update engine 305 updating any one of the pipelines 315A-N. The amalgamation engine 320 can be configured to retrieve the content recommendations whenever an online document is visited. The amalgamation engine 320 can be configured to retrieve the content recommendations upon fulfilling a condition, such as publication of an online document on a website. The amalgamation engine 320 can be configured to retrieve the content recommendations upon reaching a threshold number of visits on the online document. The amalgamation engine 320 can be configured to send content recommendations to the recommendations storage 325.

The recommendations storage 325 can be configured to store the content recommendations provided by the amalgamation for the list of recommendations 215 A-N in the online document 200 displayed on a computing device 110. The recommendations storage 325 can be configured to retrieve content recommendations at any frequency from the amalgamation engine 320. The frequencies can be based on time interval, counter, fulfillment of a condition, or the number of visits, or any combination thereof. For example, the recommendation storage 325 can be configured to retrieve content recommendations at a frequency independent of the amalgamation engine 320 or the update engine 305 updating any one of the pipelines 315A-N, the recommendations storage 325 can be configured to retrieve the content recommendations whenever an online document is visited. The recommendations storage 325 can be configured to retrieve the content recommendations upon fulfilling a condition, such as the publication of an online document on the website. The recommendations storage 325 can be configured to retrieve the content recommendation upon reaching a threshold number of visits of the online document.

Figure 4:
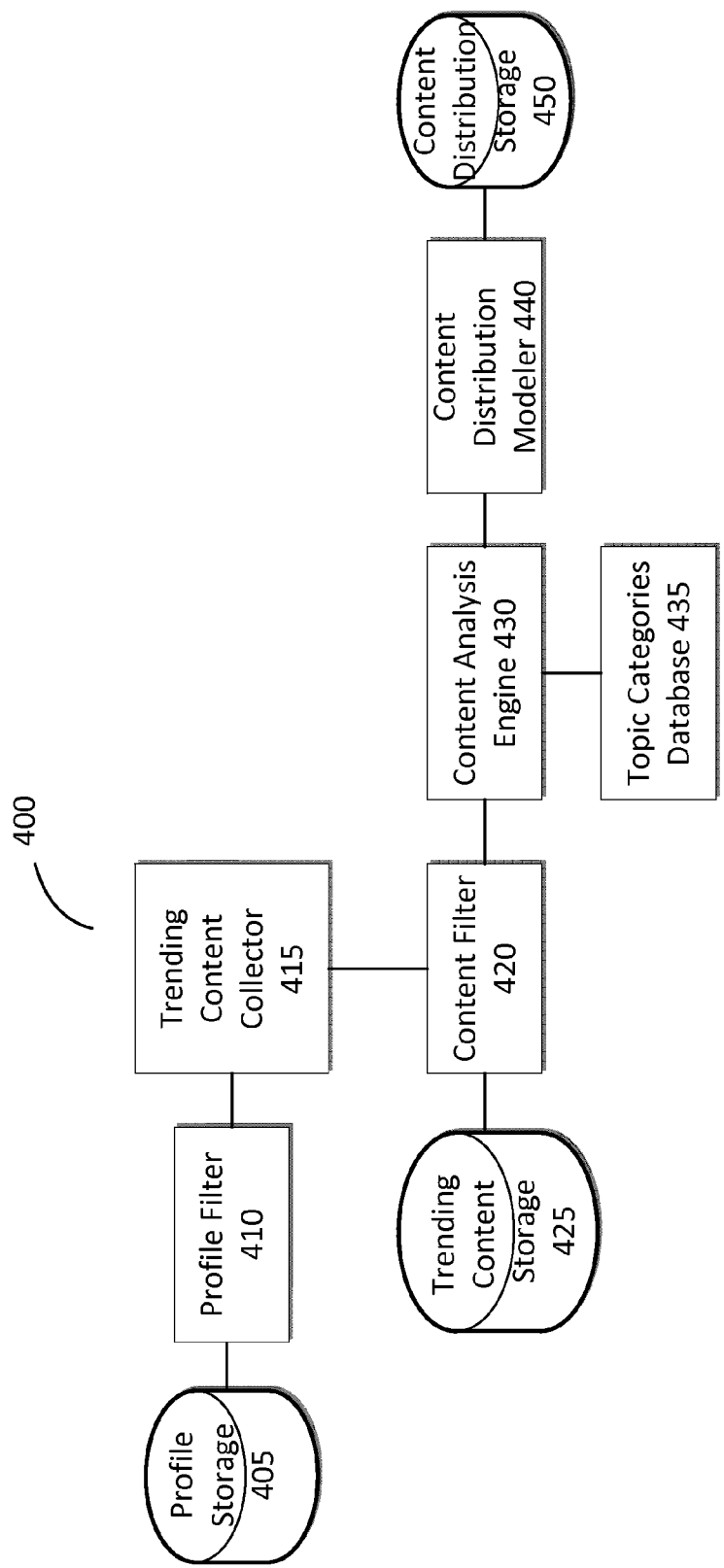
FIG. 4 is an illustration of one of the pipelines for recommending content item in real-time or near real-time in accordance with an implementation.

FIG. 4 is an illustration of a system for recommending content in real-time or near real-time in accordance with an implementation. The selection engine 400 can correspond to an implementation of one of the pipelines in 315A-N as seen in FIG. 3A or 3B executing on data processing system 120 or any one or more of the components in system 100. The selection engine 400 can be configured to be updated by the update engine 305. The selection engine 400 can be configured to comprise: a profile storage 405, profile filter 410, trending content collector 415, content filter 420, trending content storage 425, content analysis engine 430, content distribution modeler 440, and content distribution storage 450.

The profile storage 405 can correspond to one of the database storages 310A-N or any one or more components of system 100 such as database 150. The profile storage 405 can be configured to contain a list of profiles that include URLs or content item identifiers associated with the profile. Each profile can correspond to the visits made on an online document categorized in any manner. Each profile can correspond to the visits made by a single device or a group of devices. Each profile can correspond to the visits made by a user or the user's devices. Each profile can correspond to the visits made by a user or a group of users' devices.

The profile filter 410 can be configured to retrieve profiles from the profile storage 405. The profile filter 410 can be configured to select profiles retrieved determined to be premium. A premium profile can be a profile that has subscribed for a content recommendation service. A premium profile can be a profile that is a subscriber of a website associated with a content publisher 115. A premium profile can be a profile with over a threshold number of visits on an online document or a website associated with a content publisher 115.

The trending content collector 415 can be configured to retrieve the profiles determined to be premium from the profile filter 410 and generate top ranking popular URLs or content item identifiers from those visited by the premium profiles. The trending content collector 415 can be configured to retrieve the premium profiles at a frequency independent of the update engine 305 updating the pipeline 315A-N. For example, the trending content collector 415 can be configured to retrieve the premium profiles at every 2 to 15 minutes, while the update engine 305 updates the respective pipeline at every 30 minutes to 2 hours. The trending content collector can be configured to retrieve premium profiles at the same frequency as the update engine 305 updates pipelines 315 A-N.

The content filter 420 can be configured to retrieve the top ranking popular URLs or content item identifiers from the trending content collector 415. The content filter 420 can be configured to filter from the top ranking popular URLs or content item identifiers those URLs or content item identifiers determined to be unsuitable. Unsuitable URLs or content item identifiers can include homepages, hub pages, or private pages. Unsuitable URLs or content item identifiers can include those set by the content publisher 115. The content filter 420 can determine that a URL or a content item identifier is unsuitable by processing the address. For example, the content filter 420 can determine that the address "online.wsj.com" is a homepage and thus unsuitable, because it only includes the domain name. The content filter 420 can determine that the address "online.wsj.com/business" is a hubpage and thus unsuitable, because the address lacks a path name beyond the first path name. The content filter 420 can determine that an address is a private page and thus unsuitable by looking up a table of private pages stored in a database 150 or any one or more components of the system 100. The content filter 420 can determine that an address is set to be unsuitable by the content publisher 115 by looking up a table of unsuitable pages stored in a database 150 or any one or more components of the system 100.

The trending content storage 425 can be configured to retrieve the top ranking popular URLs or content item identifiers filtered by the content filter 420 for storage. The trending content storage 425 can be configured to send the top ranking popular URLs or content item identifiers as content recommendations to the amalgamation engine 320. The trending content storage 425 can be configured to also wait for retrieval of the top ranking popular URLs or content item identifiers as content recommendations from the amalgamation engine 320.

The content analysis engine 430 can be configured to retrieve the top ranking popular URLs or content item identifiers filtered by the content filter 420. The content analysis engine 430 can analyze the top ranking popular URLs or content items based on topic categories and attributes. The content analysis engine 430 can be configured to determine the topic category of the top ranking popular URLs or content item identifiers by processing the text of the online document indicated by the URL or content item identifier using natural language processing algorithms such as semantic analysis or information retrieval. The content analysis engine 430 can be configured to determine the topic category of the top ranking popular URLs or content item identifiers by looking up the topic tags of the URLs or content item identifiers. The content analysis engine 430 can be configured to determine the topic category of the top ranking popular URLs or content item identifiers by processing the text of the URL or content item identifier. The content analysis engine 430 can be configured to output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The content analysis engine 430 can be configured to retrieve also retrieve the topic categories and topic category attributes from a separate topic categories database 435. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

The content distribution modeler 440 can be configured to retrieve the list of URLs or content item identifiers categorized by topic category and topic category attribute. The content distribution modeler 440 can be configured to model a distribution based on topic category. The content distribution modeler 440 can be configured to model the distribution using any number of statistical analytical techniques. For example, the content distribution modeler 440 can be configured to provide a histogram of the distribution. The content distribution modeler 440 can provide other statistical descriptions of the distribution, such as mean, median, mode, range, standard deviation, variance, correlation, and the like. The content distribution modeler 440 can be configured to provide a statistical analysis of the distribution, such as regression analysis or analysis of variance.

The content distribution storage 450 can be configured to retrieve the distribution of the URLs or content item identifiers categorized by topic category and topic category attribute from the content distribution modeler 440. The content distribution storage 450 can be configured to store any number of distributions of URLs or content item identifiers categorized by topic category and topic category attribute. The content storage 450 can be configured to provide, responsive to a request from a content publisher 115 or content provider 125, or any entity associated with either, the distribution. The content storage 450 can be configured to provide, responsive to a request from a content publisher 115 or content provider 125, or any entity associated with either, the distribution for display on a computing device.

Figure 5:
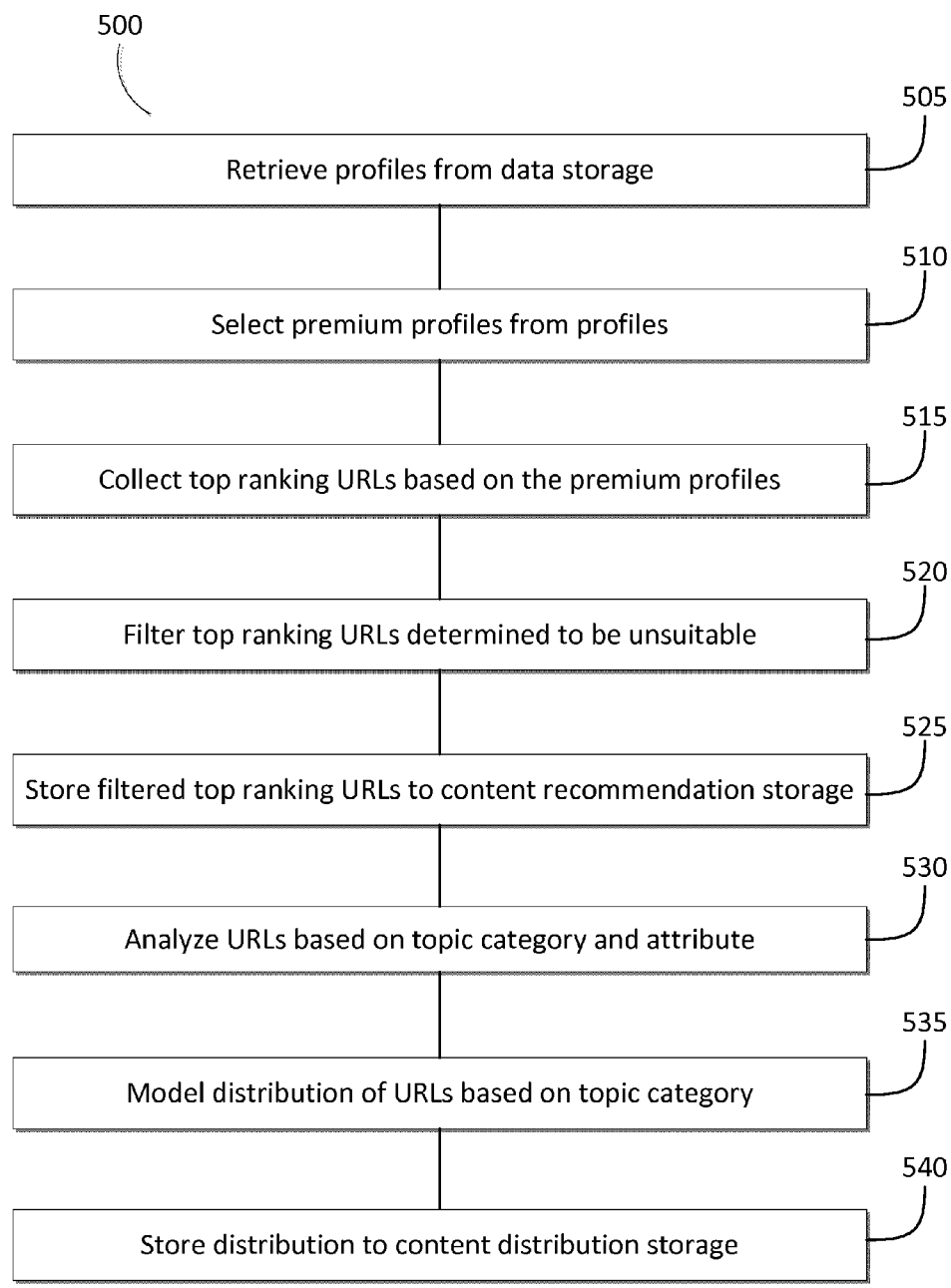
FIG. 5 is an illustration of a flow chart for recommending content items in real-time or near real-time in accordance with an implementation.

FIG. 5 is an illustration of a method 500 of recommending content from a content publisher in real-time or near real-time in accordance with an implementation. The method 500 can be performed by data processing system 120 or any one or more of the components in system 100. The method 500 can be performed by any of the pipelines 315A-N executing on the data processing system 120 or any one or more components of system 100. The method 500 can be performed by the selection engine 400 of FIG. 4 described above. The method 500 can be performed at a frequency. The frequency can be, for example, based on time interval, counter, a fulfillment of a condition, or the number of visits. In brief overview, at act 505, the system can retrieve profiles from a data storage. At act 510, the system can select premium profiles from the profiles. At act 515, the system can collect the top ranking URLs or content item identifiers based on the premium profiles. At act 520, the system can filter the top ranking URLs or content item identifiers determined to be unsuitable. At act 525, the system can store the filtered top ranking URLs or content item identifiers into a content recommendation storage. At act 530, the system can generate a list of URLs or content item identifiers with related URLs or content item identifiers based on topic category and topic category attribute. At act 535, the system can model a distribution of the URLs or content item identifiers based on the topic category and topic category attribute. At act 540, the system can store the distribution of the URLs or content item identifiers into a content distribution storage.

In further detail, at act 505, the system can retrieve the profiles from a data storage. The data storage can be located in any one or more components of the system 100, such as the database storages 310A-N or the database 150. The system can retrieve the profiles from a data storage via the network 105. The data storage can contain a list of profiles that include URLs or content item identifiers visited by the profile. Each profile can correspond to the visits made by users categorized in any manner. Each profile can correspond to the visits made by a single device or a group of devices. Each profile can correspond to the visits made by a user or the user's devices. The profiles can correspond to the visits made by a group of users' devices.

At act 510, the system can select premium profiles from the profiles retrieved from the data storage. The system can also retrieve the profiles retrieved from the data storage and then select profiles determined to be premium from the profiles retrieved. The system can also directly select premium profiles from the data storage. A premium profile can be a profile that has subscribed for a content recommendation service. A premium profile can be a profile that is a subscriber of a website associated with a content publisher 115. A premium profile can be a profile with over a threshold number of visits on an online document or a website associated with a content publisher 115.

At act 515, the system can collect the top ranking URLs or content item identifiers based on those stored in the premium profiles. The system can collect also retrieve the premium profiles at act 515 and then collect the top ranking URLs or content item identifiers based on the premium profiles retrieved. The system can collect the top ranking URLs or content item identifiers by processing the URLs or content item identifiers visited by the premium profiles. The system can execute act 515 at a frequency independent of the system executing other acts in method 500. For example, the system can execute act 515 every 5 minutes to 10 minutes but other acts 505, 510, 520, 525, 530, 535, and 540 every 30 minutes to 2 hours. The system can execute also act 515 at the same frequency as the other acts in method 500.

At act 520, the system can filter from the top ranking popular URLs or content item identifiers those URLs or content item identifiers determined to be unsuitable. The system can retrieve the top ranking popular URLs or content item identifiers and then filter from the top ranking popular URLs or content item identifiers those URLs or content item identifiers determined to be unsuitable. For example, unsuitable URLs or content item identifiers can include homepages, hub pages, or private pages. Unsuitable URLs or content item identifiers can include those set by the content publisher 115. The system can determine that a URL or a content item identifier is unsuitable by processing the address. For example, the system can determine that the address "online.wsj.com" is a homepage and thus unsuitable, because it only includes the domain name. The system can determine that the address "online.wsj.com/business" is a hubpage and thus unsuitable, because the address lacks a path name beyond the first path name. The system can determine that an address is a private page and thus unsuitable by looking up a table of private pages stored in a database 150 or any one or more components of the system 100.

At act 525, the system can store the filtered top ranking URLs or content item identifiers to a content recommendation storage. The system can also send the top ranking popular URLs or content item identifiers as content recommendations to the amalgamation engine 320 or any one or more components of the system 100. The system can send the top ranking popular URLs or content item identifiers via the network 105. The system can also wait for retrieval of the top ranking popular URLs or content item identifiers as content recommendations from the amalgamation engine 320 or any other component in the system.

At act 530, the system can analyze the top ranking popular URLs or content items based on topic categories and attributes. The system can retrieve the top ranking popular URLs or content item identifiers filtered at act 520 and then analyze the top ranking popular URLs or content items based on topic categories and attributes. The system can determine the topic category of the top ranking popular URLs or content item identifiers by processing the text of the online document indicated by the URL or content item identifier using natural language processing algorithms such as semantic analysis or information retrieval. The system can determine the topic category of the top ranking popular URLs or content item identifiers by looking up the topic tag of the URL or content item identifier. The system can determine the topic category of the top ranking popular URLs or content item identifiers by processing the text of the URL or content item identifier. The system can output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The system can retrieve the topic categories and topic category attributes from a separate topic categories database. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

At act 535, the system can model the distribution of the URLs or content item identifiers categorized by topic category model the distribution using any number of statistical analytical techniques. The system can retrieve the list of URLs or content item identifiers categorized by topic category and topic category attributes. The system can model the distribution using any number of statistical analytical techniques. For instance, the system can model can provide a histogram of the distribution. The system can provide other statistical descriptions of the distribution, such as mean, median, mode, range, standard deviation, variance, correlation, and et cetera. The system can also provide a statistical analysis of the distribution, such as regression analysis or analysis of variance.

At act 540, the system can retrieve the distribution of the URLs or content item identifiers categorized by topic category and topic category attribute. The system can store any number of distributions of URLs or content item identifiers categorized by topic category and topic category attribute. The system can provide, responsive to a request from a content publisher 115 or content provider 125, or any entity associated with either, the distribution. The system can provide, responsive to a request from a content publisher 115 or content provider 125, or any entity associated with either, the distribution for display on the display of a computing device.

Figure 6:
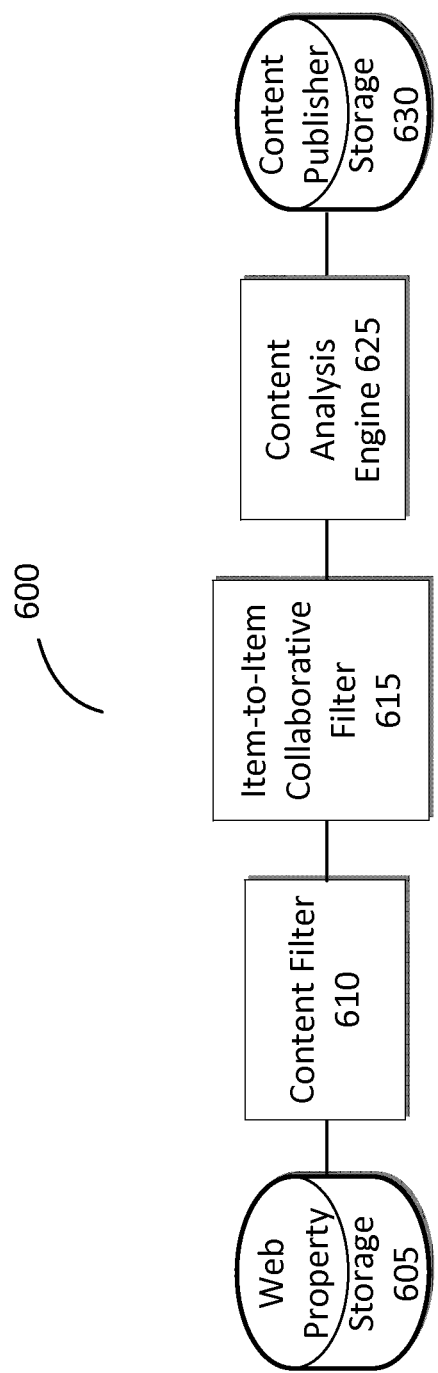
FIG. 6 is an illustration of one of the pipelines for recommending content item in real-time or near real-time in accordance with an implementation.

FIG. 6 is an illustration of a system for recommending content in real-time or near real-time in accordance with an implementation. The selection engine 600 can correspond to an implementation of one of the pipelines in 315A-N executing on data processing system 120. The selection engine 600 can be configured to be updated by the update engine 305. The selection engine 600 can be configured to comprise: a web property storage 605, content filter 610, item-to-item collaborative filter 615, content analysis engine 625, and content publisher storage 630.

The web property storage 605 can correspond to any of the database storages 310A-N or any one or more components of system 100. The web property storage 605 can be configured to contain web property visit data, such as URLs or content item identifiers visited on the website. The web property visit data can comprise server logs created and maintained by one or more of the components in system 100 that indicate the visits on the one or more components in the system 100, such as a web server of the content provider 125 or content publisher 115. The web property storage 605 can be configured to contain a list of profiles that include URLs or content item identifiers associated with the profile. The web property storage 605 can be configured to be part of the one, same module that contains web property visit data. For example, profile storage 405 and web property storage 605 can be one database of web property visit data such as database 150 of the system 100.

The content filter 610 can be configured to retrieve URLs or content item identifier from the web property storage 605. The content filter 610 can be configured to filter from the URLs or content item identifiers those URLs or content item identifiers determined to be unsuitable. For example, unsuitable URLs or content item identifiers can, for example, include homepages, hub pages, or private pages. Unsuitable URLs or content item identifiers can include those set by the content publisher 115. The content filter 610 can determine that a URL or a content item identifier is unsuitable by processing the address. For example, the content filter 420 can determine that the address "online.wsj.com" is a homepage and thus unsuitable, because it only includes the domain name. The content filter 610 can determine that the address "online.wsj.com/business" is a hubpage and thus unsuitable, because the address lacks a path name beyond the first path name. The content filter 610 can determine that an address is a private page and thus unsuitable by looking up a table of private pages stored in a database 150 or any one or more components of the system 100. The content filter 610 can determine that an address is set to be unsuitable by the content publisher 115 by looking up a table of unsuitable pages stored in a database 150 or any one or more components of the system 100.

The item-to-item collaborative filter 615 can be configured to retrieve the filtered URLs or content item identifiers from the content filter 610. The item-to-item collaborative filter 615 can be configured to generate a map of each URL or content item identifier correlated with URLs or content item identifiers based on the correlation of web property visit data in a single session described below with FIG. 10. The item-to-item collaborative filter 615 can also be configured to also generate the map of URLs or content item identifiers ranked by correlation scores for each URL or content item identifier.

The content analysis engine 625 can be configured to retrieve the top ranking popular URLs or content item identifiers filtered by the content filter 625. The content analysis engine 430 can analyze the top ranking popular URLs or content items based on topic categories and attributes. The content analysis engine 625 can be configured to determine the topic category of the top ranking popular URLs or content item identifiers by processing the text of the online document indicated by the URL or content item identifier using natural language processing algorithms such as semantic analysis or information retrieval. The content analysis engine 625 can be configured to determine the topic category of the URLs or content item identifiers by looking up the topic tags of the URLs or content item identifiers. The content analysis engine 625 can be configured to determine the topic category of the top ranking popular URLs or content item identifiers by processing the text of the URL or content item identifier. The content analysis engine 625 can be configured to output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The content analysis engine 625 can be configured to retrieve also retrieve the topic categories and topic category attributes from a separate topic categories database. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

The content publisher storage 630 can be configured to retrieve the list of URLs or content item identifiers categorized by topic categories and topic category attributes. The content publisher storage 630 can be configured to send the URLs or content item identifiers as content recommendations to the amalgamation engine 320. The content publisher storage 630 can be configured to also wait for retrieval of the URLs or content item identifiers as content recommendations from the amalgamation engine 320.

Figure 7:
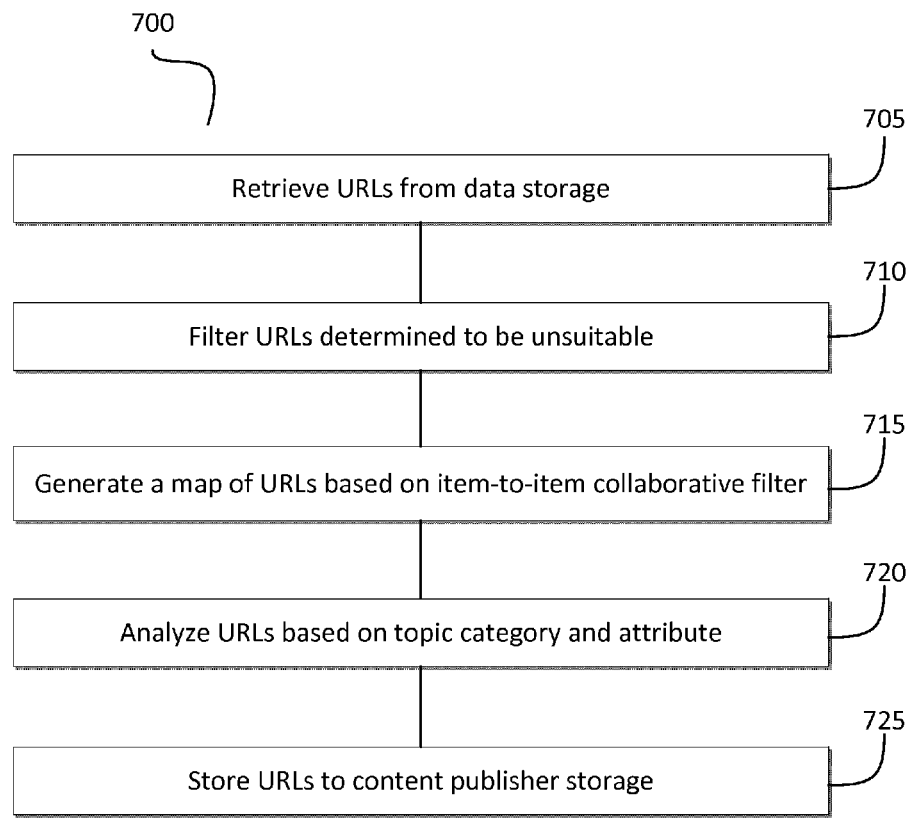
FIG. 7 is an illustration of a flow chart for recommending content items in real-time or near real-time in accordance with an implementation.

FIG. 7 is an illustration of a method 700 of recommending content from a content publisher in real-time or near real-time in accordance with an implementation. The method 700 can be performed by data processing system 120 or any one or more of the components in system 100. The method 500 can be performed by any of the pipelines 315A-N executing on the data processing system 120 or any one or more components of system 100. The method 700 can be performed by the selection engine 600 of FIG. 6 described above. The method 700 can be performed at a frequency. The frequency can be, for example, based on time interval, counter, a fulfillment of a condition, or the number of visits. In brief overview, at act 705, the system can retrieve URLs from a web property storage. At act 710, the system can filter from URLs from those URLs determined to be unsuitable. At act 715, the system can correlate each URL or content item identifier to each other URL based on an item-to-item collaborative filter. At 720, the system can analyze the URLs or content item identifiers based on topic categories or topic category attributes. At act 725, the system can store the URLs or content item identifiers to a content publisher storage.

In further detail, at act 705, the system can retrieve web property visit data from a data storage, such as the database storages 310A-N or the database 150. Web property visit data can include URLs or content item identifiers visited on the website. The web property visit data can comprise server logs created and maintained by one or more of the components in system 100 that indicate the visits or activities on the one or more components in the system 100, such as a web server of the content provider 125 or content publisher 115. Web property visit data can also include a list of profiles that include URLs or content item identifiers associated with the profile.

At act 710, the system can filter from the URLs or content item identifiers those URLs or content item identifiers determined to be unsuitable. Unsuitable URLs or content item identifiers can, for example, include homepages, hub pages, or private pages. Unsuitable URLs or content item identifiers can include those set by the content publisher 115. The system can determine that a URL or a content item identifier is unsuitable by processing the address. For example, the system can determine that the address "online.wsj.com" is a homepage and thus unsuitable, because it only includes the domain name. The system can determine that the address "online.wsj.com/business" is a hubpage and thus unsuitable, because the address lacks a path name beyond the first path name. The system can determine that an address is a private page and thus unsuitable by looking up a table of private pages stored in a database 150 or any one or more components of the system 100. The system can determine that an address is set to be unsuitable by the content publisher 115 by looking up a table of unsuitable pages stored in a database 150 or any one or more components of the system 100.

At act 715, the system can generate a map of each URL or content item identifiers correlated with other URLs or content item identifiers based on the correlation of web property visit data in a single session as described below with FIG. 10. The system can retrieve the URLs or content item identifiers from those URLs or content item identifiers filtered in act 710. The system can also generate a map of URLs or content item identifiers ranked by correlation scores for each URL or content item identifier.

At act 720, the system can analyze the URLs or content item identifiers based on topic categories and attributes. The system can retrieve the URLs or content item identifiers filtered and then analyze the URLs or content items based on topic categories and attributes. The system can determine the topic category of the URLs or content item identifiers by processing the text of the online document indicated by the URL or content item identifier using natural language processing algorithms such as semantic analysis or information retrieval. The system can determine the topic category of the URLs or content item identifiers by looking up the topic tag of the URL or content item identifier. The system can determine the topic category of the URLs or content item identifiers by processing the text of the URL or content item identifier. The system can output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The system can retrieve the topic categories and topic category attributes from a separate topic categories database. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

At act 725, the system can store the URLs or content item identifiers to a content publisher storage. The system can also retrieve the list of URLs or content item identifiers categorized by topic categories and topic category attributes. The system can also send the URLs or content item identifiers as content recommendations to the amalgamation engine 320 or any other component in the system. The system can also wait for retrieval of URLs or content item identifiers as content recommendations from the amalgamation engine 320 or any other component in the system.

Figure 8:
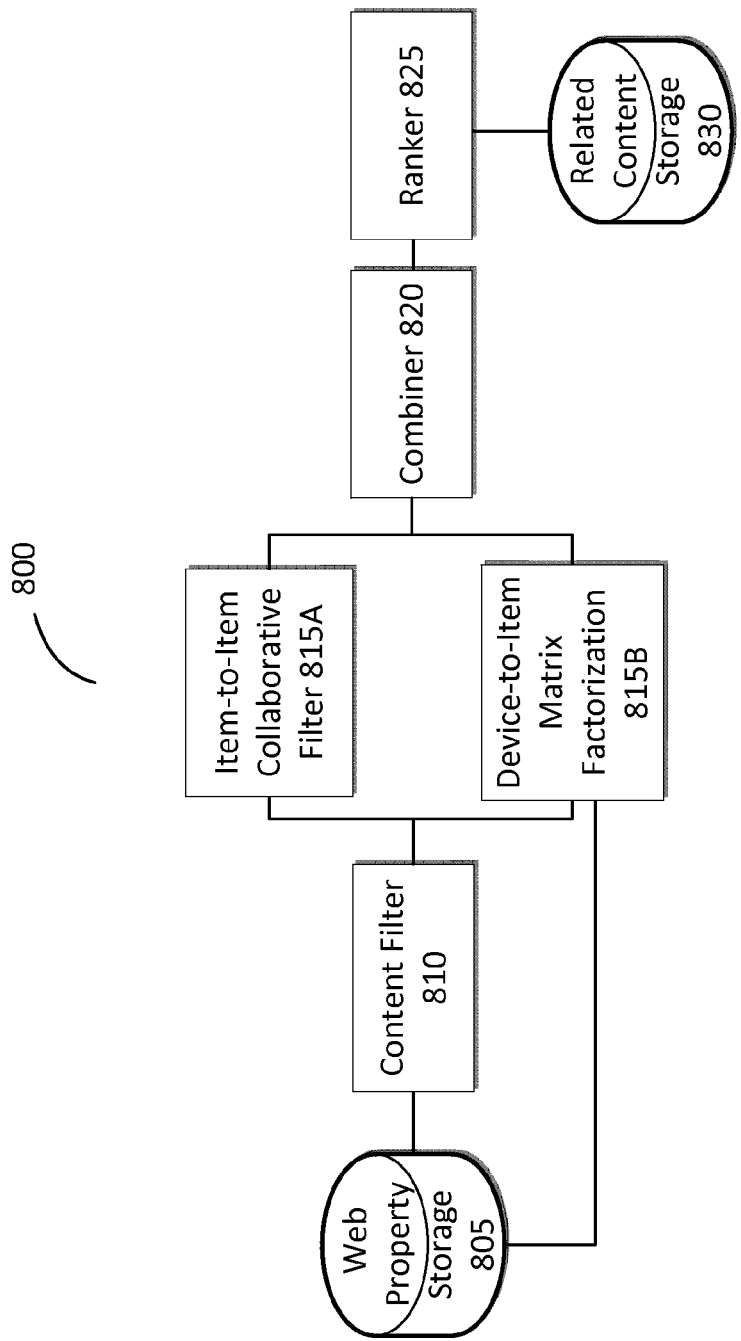
FIG. 8 is an illustration of one of the pipelines for recommending content item in real-time or near real-time in accordance with an implementation.

FIG. 8 is an illustration of a system for recommending content in real-time or near real-time in accordance with an implementation. The selection engine 800 can correspond to an implementation of one of the pipelines in 315A-N executing on a data processing system 120 or any one or more of the components in system 100. The selection engine 800 can be configured to be updated by the update engine 305. The selection engine 800 can be configured to comprise: a web property storage 805, content filter 810, item-to-item collaborative filter 815A, device-to-item matrix factorization module 815B, combiner 820, ranker 825, and related content storage 830.

The web property storage 805 can correspond to any of the database storages 310A-N or any one or more components of system 100. The web property storage 805 can be configured to contain web property visit data, such as URLs or content item identifiers visited on the website. The web property visit data can comprise server logs created and maintained by one or more of the components in system 100 that indicate the visits or activities on the one or more components in the system 100, such as a web server of the content provider 125 or content publisher 115. The web property storage 805 can be configured to contain a list of profiles that include URLs or content item identifiers associated with the profile. The web property storage 605 can be configured to be part of the one, same module that contains web property visit data. For example, profile storage 405, web property storages 605 and 805 can be one database of web property visit data such as database 150 of the system 100.

The content filter 810 can be configured to retrieve URLs or content item identifiers from the web property storage 805. The content filter 810 can also be configured to filter from the URLs or content item identifiers retrieved those URLs or content item identifiers determined to be unsuitable. Unsuitable URLs or content item identifiers can, for example, include homepages, hub pages, or private pages. Unsuitable URLs or content item identifiers can include those set by the content publisher 115. The content filter 810 can determine that a URL or a content item identifier is unsuitable by processing the address. For example, the content filter 420 can determine that the address "online.wsj.com" is a homepage and thus unsuitable, because it only includes the domain name. The content filter 810 can determine that the address "online.wsj.com/business" is a hubpage and thus unsuitable, because the address lacks a path name beyond the first path name. The content filter 810 can determine that an address is a private page and thus unsuitable by looking up a table of private pages stored in a database 150 or any one or more components of the system 100. The content filter 810 can determine that an address is set to be unsuitable by the content publisher 115 by looking up a table of unsuitable pages stored in a database 150 or any one or more components of the system 100.

The item-to-item collaborative filter 815A can be configured to retrieve the filtered URLs or content item identifiers from the content filter 810. The item-to-item collaborative filter 815A can also be configured to generate a map of each URL or content item identifier with URLs or content item identifiers based on the correlation of web property visit data in a single session as described below with FIG. 12. The item-to-item collaborative filter 815A can be configured to generate a correlation score based on the map of each URL or content item identifier with URLs or content item identifiers correlated by web property data in a single session. The item-to-item collaborative filter 815A can be configured to generate the map of URLs or content item identifiers ranked by correlation scores for each URL or content item identifier.

The device-to-item matrix factorization module 815B can be configured to retrieve the filtered URLs or content item identifiers from the content filter 810. The device-to-item factorization module 815B can be configured to retrieve context information and the attributes of a user, device, or group of users or devices, or any other web property visit data from web property storage 805. The device-to-item matrix factorization module 815B can be configured to generate a map of users, devices, groups of users or devices to URLs or content item identifiers based on the web property visit data as described below with FIG. 13. The device-to-item matrix factorization module 815B can be configured to generate an affinity score based on the number of visits by user, device, or groups of users or devices for each URL or content item identifier based on the web property visit data. The device-to-item matrix factorization module 815B can be configured to generate the affinity score based further on context information and attributes associated with a user, device, or group of users or devices. The context information can be used, for example, as constraints on how the device-to-item matrix is factorized. The device-to-item matrix factorization module 815B can be configured to rank the users, devices, or groups of users or devices versus the URLs or content item identifiers based on the affinity scores.

The combiner module 820 can be configured to retrieve the correlation scores generated by the item-to-item collaborative filter module 815A and the affinity scores from the device-to-item matrix factorization module 815B. The combiner module 820 can be configured to combine the correlation scores and the affinity scores to generate a final score for each of the URLs or content item identifiers. The combination can be of any function of the correlation scores or the affinity scores. For example, the combiner module 815A can be configured to take the product of the correlation scores and the affinity scores as the final score. The combiner module 815A can be configured to take the weighted sum of the correlation score and the affinity scores as the final score.

The ranker module 825 can be configured to retrieve the correlation score generated in the item-to-item collaborative filter module 815A and the affinity scores from the device-to-item matrix factorization module 815B. The ranker module 825 can be configured to retrieve click feedback data for each device, user, or group of devices or users from a storage module, such as the database 150 or any one or more components of the system 100. The ranker module 825 can be configured to rank a combination of the correlation scores and affinity scores to generate rank, parameterized by the click feedback data for each device, user, or group of devices or users. For example, the ranker module 825 can be configured to rank based on a linear regression technique of the correlation scores and the affinity scores, parameterized by click feedback data for each device, user, or group of devices or users. The ranker module 825 can be configured to generate a list of URLs or content item identifiers ranked by a combination of correlation scores and affinity scores, parameterized by each device, user, or group of devices or users.

The related content storage 830 can be configured to retrieve a list of URLs or content item identifiers ranked based on the combination of correlation scores and affinity scores. The related content storage 830 can be configured to select and store some of the top ranked on the list of URLs or content item identifiers. The content publisher storage 830 can be configured to send the URLs or content item identifiers retrieved as content recommendations to the amalgamation engine 320. The related content storage 830 can be configured to also wait for retrieval of the URLs or content item identifiers as content recommendations from the amalgamation engine 320.

Figure 9:
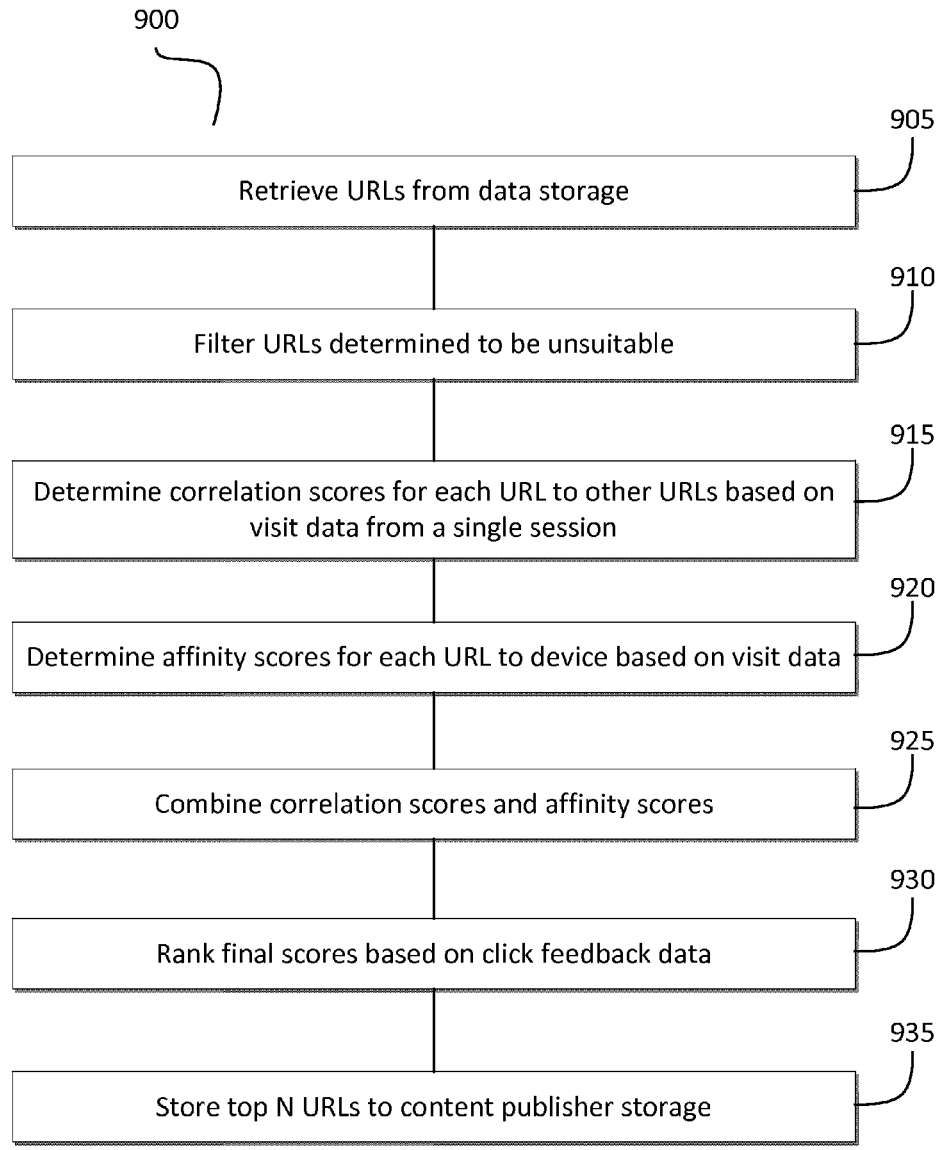
FIG. 9 is an illustration of a flow chart for recommending content items in real-time or near real-time in accordance with an implementation.

FIG. 9 is an illustration of a method 900 of recommending content from a content publisher in real-time or near real-time in accordance with an implementation. The method 900 can be performed by data processing system 120 or any one or more of the components in system 100. The method 900 can be performed by any of the pipelines 315A-N executing on the data processing system 120 or any one or more components of system 100. The method 900 can be performed by the selection engine 800 of FIG. 8 described above. The method 900 can be performed at a frequency. The frequency can be, for example, based on time interval, counter, a fulfillment of a condition, or the number of visits. In brief overview, at act 905, the system can retrieve URLs or content item identifiers from a data storage. At act 910, the system can filter URLs determined to be unsuitable. At act 915, the system can determine correlation scores for each URL correlated to other URLs based on web property visit data from a single session. At act 920, the system can determine affinity scores for each URL to device based on web property visit data of a device. At act 925, the system can combine the correlation scores and affinity scores to generate a final score. At act 930, the system ranks the final scores based on click feedback data. At act 935, the system can store some of the top ranked URLs or content item identifiers to a content publisher storage.

In further detail, at act 905, the system can retrieve web property visit data from a data storage, such as the database storages 310A-N or the database 150. Web property visit data can include URLs or content item identifiers visited on the website by users. The web property visit data can comprise server logs created and maintained by one or more of the components in system 100 that indicate the visits or activities on the one or more components in the system 100, such as a web server of the content provider 125 or content publisher 115. Web property visit data can also include a list of profiles that include URLs or content item identifiers associated with the profile.

At act 910, the system can filter from the URLs or content item identifiers retrieved those URLs or content item identifiers determined to be unsuitable. Unsuitable URLs or content item identifiers can, for example, include homepages, hub pages, or private pages. Unsuitable URLs or content item identifiers can include those set by the content publisher 115. The system can determine that a URL or a content item identifier is unsuitable by processing the address. For example, the system can determine that the address "online.wsj.com" is a homepage and thus unsuitable, because it only includes the domain name. The system can determine that the address "online wsj.com/business" is a hubpage and thus unsuitable, because the address lacks a path name beyond the first path name. The system can determine that an address is a private page and thus unsuitable by looking up a table of private pages stored in a database 150 or any one or more components of the system 100. The system can determine that an address is set to be unsuitable by the content publisher 115 by looking up a table of unsuitable pages stored in a database 150 or any one or more components of the system 100.

At act 915, the system can generate a map of each URL or content item identifier with URLs or content item identifiers based on the correlation of web property visit data in a single session as described below with FIG. 12. The system can generate a correlation score based on the map of each URL or content item identifier with URLs or content item identifiers correlated by web property data in a single session. The system can also generate the map of URLs or content item identifiers ranked by correlation scores for each URL or content item identifier.

At act 920, the system can determine an affinity score of each URL or content item identifier to a user, device, or group of users or devices. The system can generate a map of users, devices, groups of users or devices to URLs or content item identifiers based on web property visit data as described below with FIG. 13. The system can retrieve the context information and attributes of user, device, or group of users or devices, or any other web property visit data from any data storage. The system can generate an affinity score based on the number of visits by user, device, or groups of users or devices for each URL or content item identifier. The system can generate the affinity score based further on context information and attributes associated with the user, device, or group of users or devices. The system can rank the users, devices, or groups of users or devices versus the URLs or content item identifiers based on the affinity scores.

At act 925, the system can combine the correlation scores and the affinity scores to generate a final score for each of the URLs or content item identifiers. The combination can be of any function of the correlation scores or the affinity scores. For example, the combiner system can take the product of the correlation scores and the affinity scores as the final score. The system can take the weighted sum of the correlation score and the affinity scores as the final score.

At act 930, the system can rank a combination of the correlation scores and affinity scores to generate rank, parameterized by the click feedback data of each device, user, or group of devices or users for each URL or content item identifier. The system can also retrieve click feedback data for each device, user, or group of devices or users from storage in one or more components of the system 100. The system can use any number of techniques for ranking. For example, the system can be configured to rank based on a linear regression technique of the correlation scores and the affinity scores, parameterized by click feedback data for each device, user, or group of devices or users. The system can generate a list of URLs or content item identifiers ranked by a combination of correlation scores and affinity scores, parameterized by each device, user, or group of devices or users.

At act 935, the system can store the URLs or content item identifiers to a content publisher storage. The system can also retrieve the list of URLs or content item identifiers categorized by topic categories and topic category attributes. The system can also send the URLs or content item identifiers as content recommendations to the amalgamation engine 320 as or any other component in the system. The system can also wait for retrieval of URLs or content item identifiers as content recommendations from the amalgamation engine 320 or any other component in the system.

Figure 10:
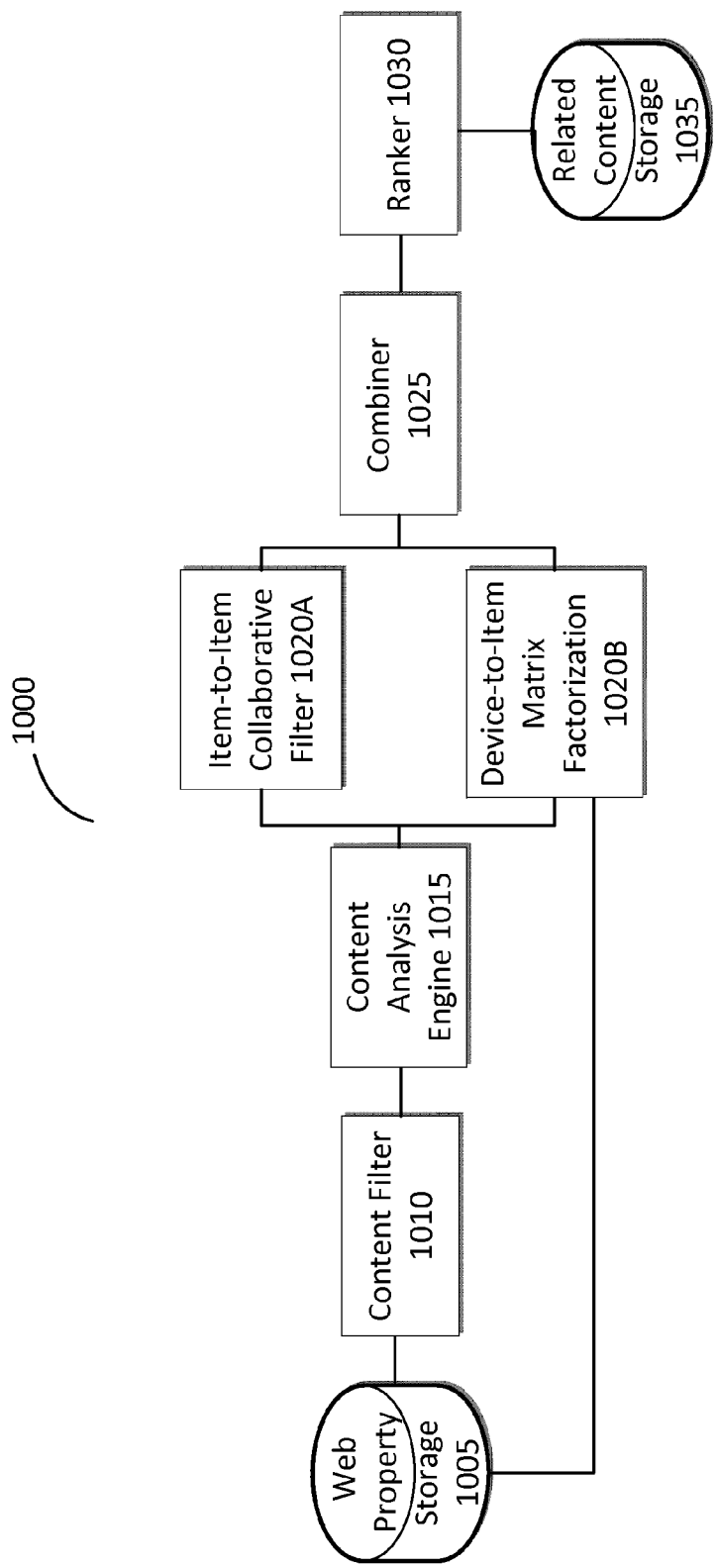
FIG. 10 is an illustration of one of the pipelines for recommending content item in real-time or near real-time in accordance with an implementation.

FIG. 10 is an illustration of a system for recommending content in real-time or near real-time in accordance with an implementation. The selection engine 1000 can correspond to an implementation of one of the pipelines in 315A-N executing on data processing system 120 or any one or more components in system 100. The selection engine 1000 can be configured to be updated by the update engine 305. The selection engine 1000 can be configured to comprise: a web property storage 1005, content filter 1010, content analysis engine 1015, item-to-item collaborative filter 1020A, device-to-item matrix factorization module 1020B, combiner 1025, ranker 1030, and related content storage 1035.

The web property storage 1005 can correspond to any of the database storages 310A-N or any one or more components of system 100. The web property storage 1005 can be configured to contain web property visit data, such as URLs or content item identifiers visited on the website by users. The web property visit data can comprise server logs created and maintained by one or more of the components in system 100 that indicate the visits or activities on the one or more components in the system 100, such as a web server of the content provider 125 or content publisher 115. The web property storage 1005 can be configured to contain a list of profiles that include URLs or content item identifiers associated with the profile. The web property storage 1005 can be configured to be part of the one, same module that contains web property visit data. For example, profile storage 405 and web property storages 605, 805, and 1005 can be one database of web property visit data such as database 150 of the system 100.

The content filter 1010 can be configured to retrieve URLs or content item identifiers from the web property storage 1005. The content filter 1010 can also be configured to filter from the URLs or content item identifiers retrieved those URLs or content item identifiers determined to be unsuitable. Unsuitable URLs or content item identifiers can, for example, include homepages, hub pages, or private pages. Unsuitable URLs or content item identifiers can include those set by the content publisher 115. The content filter 810 can determine that a URL or a content item identifier is unsuitable by processing the address. For example, the content filter 420 can determine that the address "online.wsj.com" is a homepage and thus unsuitable, because it only includes the domain name. The content filter 1010 can determine that the address "online wsj.com/business" is a hubpage and thus unsuitable, because the address lacks a path name beyond the first path name. The content filter 1010 can determine that an address is a private page and thus unsuitable by looking up a table of private pages stored in a database 150 or any one or more components of the system 100. The content filter 1010 can determine that an address is set to be unsuitable by the content publisher 115 by looking up a table of unsuitable pages stored in a database 150 or any one or more components of the system 100.

The content analysis engine 1015 can be configured to retrieve the top ranking popular URLs or content item identifiers filtered by the content filter 1010. The content analysis engine 430 can analyze the top ranking popular URLs or content items based on topic categories and attributes. The content analysis engine 1015 can be configured to determine the topic category of the top ranking popular URLs or content item identifiers by processing the text of the online document indicated by the URL or content item identifier using natural language processing algorithms such as semantic analysis or information retrieval. The content analysis engine 1015 can be configured to determine the topic category of URLs or content item identifiers by looking up the topic tags of the URLs or content item identifiers. The content analysis engine 1015 can be configured to determine the topic category of the top ranking popular URLs or content item identifiers by processing the text of the URL or content item identifier. The content analysis engine 1015 can be configured to output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The content analysis engine 1015 can be configured to retrieve also retrieve the topic categories and topic category attributes from a separate topic categories database. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

The item-to-item collaborative filter 1020A can be configured to retrieve the filtered URLs or content item identifiers from the content filter 1010. The item-to-item collaborative filter 1020A can be also configured to retrieve the list of URLs or content item identifiers categorized by topic category and topic category attribute from The content analysis engine 1015. The item-to-item collaborative filter 1020A can also be configured to generate a map of each URL or content item identifier with URLs or content item identifiers based on the correlation of web property visit data in a single session as described below with FIG. 12. The item-to-item collaborative filter 1020A can be configured to generate a correlation score based on the map of each URL or content item identifier with URLs or content item identifiers correlated by web property data in a single session. The item-to-item collaborative filter 1020A can also be configured to also generate the map of URLs or content item identifiers ranked by correlation scores for each URL or content item identifier.

The device-to-item matrix factorization module 1020B can be configured to retrieve the filtered URLs or content item identifiers from The content analysis engine 1015 or the content filter 1010. The device-to-item factorization module 1020B can be configured to retrieve context information and the attributes of a user, device, or group of users or devices, or any other web property visit data from web property storage 1005. The device-to-item matrix factorization module 1020B can be configured to generate a map of users, devices, groups of users or devices to URLs or content item identifiers based on the web property visit data described below with FIG. 13. The device-to-item matrix factorization module 1020B can be configured to generate an affinity score based on the number of visits by user, device, or groups of users or devices for each URL or content item identifier based on the web property visit data. The device-to-item matrix factorization module 1020B can be configured to generate the affinity score based further on context information and attributes associated with a user, device, or group of users or devices.

The context information can be used, for example, as constraints on how the device-to-item matrix is factorized. The device-to-item matrix factorization module 1020B can be configured to rank the users, devices, or groups of users or devices versus the URLs or content item identifiers based on the affinity scores.

The combiner module 1025 can be configured to retrieve the correlation scores generated in the item-to-item collaborative filter module 1020A and the affinity scores from the device-to-item matrix factorization module 1020B. The combiner module 1025 can be configured to combine the correlation scores and the affinity scores to generate a final score for each of the URLs or content item identifiers. The combination can be of any function of the correlation scores or the affinity scores. For example, the combiner module 1020A can be configured to take the product of the correlation scores and the affinity scores as the final score. The combiner module 1020A can be configured to take the weighted sum of the correlation score and the affinity scores as the final score.

The ranker module 1030 can be configured to retrieve the correlation score generated in the item-to-item collaborative filter module 1020A and the affinity scores from the device-to-item matrix factorization module 1020B. The ranker module 1030 can be configured to retrieve click feedback data for each device, user, or group of devices or users from a storage module, such as the database 150 or any one or more components of the system 100. The ranker module 1030 can be configured to rank a combination of the correlation scores and affinity scores to generate rank, parameterized by the click feedback data for each device, user, or group of devices or users. For example, the ranker module 1030 can be configured to rank based on a linear regression technique of the correlation scores and the affinity scores, parameterized by click feedback data for each device, user, or group of devices or users. The ranker module 1030 can be configured to generate a list of URLs or content item identifiers ranked by a combination of correlation scores and affinity scores, parameterized by each device, user, or group of devices or users.

The related content storage 1035 can be configured to retrieve a list of URLs or content item identifiers ranked based on the combination of correlation scores and affinity scores. The related content storage 1035 can be configured to select and store some of the top ranked on the list of URLs or content item identifiers. The content publisher storage 1035 can be configured to send the URLs or content item identifiers retrieved as content recommendations to the amalgamation engine 320. The related content storage 1035 can be configured to also wait for retrieval of the URLs or content item identifiers as content recommendations from the amalgamation engine 320.

Figure 11:
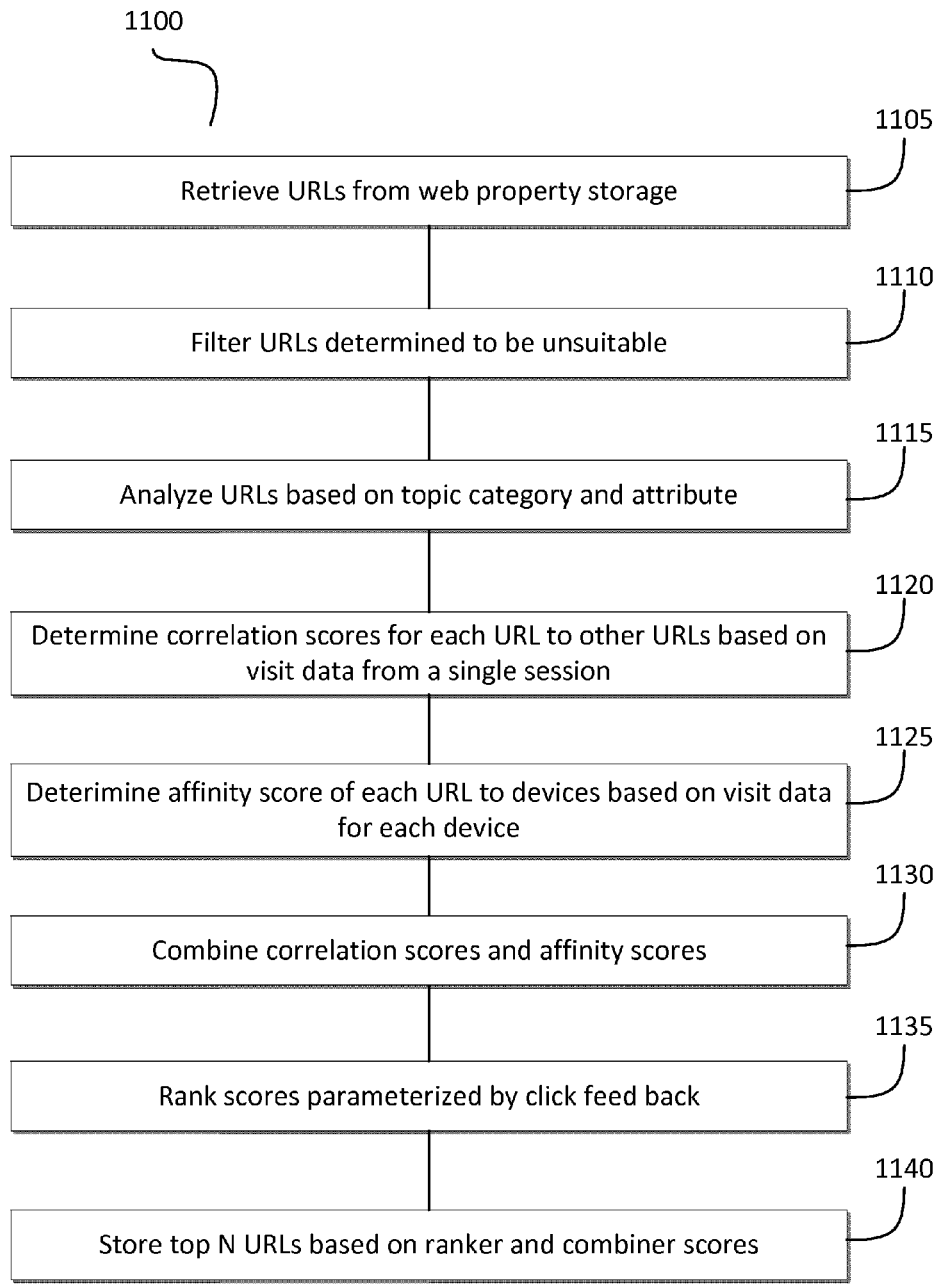
FIG. 11 is an illustration of a flow chart for recommending content items in real-time or near real-time in accordance with an implementation.

FIG. 11 is an illustration of a method 1100 of recommending content from a content publisher in real-time or near real-time in accordance with an implementation. The method 1100 can be performed by data processing system 120 or any one or more of the components in system 100. The method 1100 can be performed by any of the pipelines 315A-N executing on the data processing system 120 or any one or more components of system 100. The method 1100 can be performed by the selection engine 1000 of FIG. 10 described above. The method 1100 can be performed at a frequency. The frequency can be, for example, based on time interval, counter, a fulfillment of a condition, or the number of visits. In brief overview, at act 1105, the system can retrieve URLs or content item identifiers from a data storage. At act 1110, the system can filter URLs or content item identifiers determined to be unsuitable. At act 1115, the system can analyze the URLs or content item identifiers based on topic category and attribute. At act 1120, the system can determine correlation scores for each URL or content item identifier correlated to other URLs or content item identifiers based on web property visit data from a single session. At act 1125, the system can determine affinity scores for each URL to device based on web property visit data of a user, device, or group of users or devices. At act 1130, the system can combine the correlation scores and affinity scores to generate a final score. At act 1135, the system can rank the final scores based on click feedback data. At act 1140, the system can store some of the top ranked URLs or content item identifiers to a content publisher storage.

In further detail, at act 1105, the system can retrieve web property visit data from a data storage. Web property visit data can include URLs or content item identifiers visited on the website by users. The web property visit data can comprise server logs created and maintained by one or more of the components in system 100 that indicate the visits or activities on the one or more components in the system 100, such as a web server of the content provider 125 or content publisher 115. Web property visit data can also include a list of profiles that include URLs or content item identifiers associated with the profile.

At act 1110, the system can filter from the URLs or content item identifiers retrieved those URLs or content item identifiers determined to be unsuitable. Unsuitable URLs or content item identifiers can, for example, include homepages, hub pages, or private pages. Unsuitable URLs or content item identifiers can include those set by the content publisher 115. The system can determine that a URL or a content item identifier is unsuitable by processing the address. For example, the system can determine that the address "online.wsj.com" is a homepage and thus unsuitable, because it only includes the domain name. The system can determine that the address "online wsj.com/business" is a hubpage and thus unsuitable, because the address lacks a path name beyond the first path name. The system can determine that an address is a private page and thus unsuitable by looking up a table of private pages stored in a database 150 or any one or more components of the system 100. The system can determine that an address is set to be unsuitable by the content publisher 115 by looking up a table of unsuitable pages stored in a database 150 or any one or more components of the system 100.

At act 1115, the system can analyze the URLs or content item identifiers based on topic categories and attributes. The system can retrieve the URLs or content item identifiers filtered and then analyze the URLs or content items based on topic categories and attributes. The system can determine the topic category of the URLs or content item identifiers by processing the text of the online document indicated by the URL or content item identifier using natural language processing algorithms such as semantic analysis or information retrieval. The system can determine the topic category of the URLs or content item identifiers by processing the text of the URL or content item identifier. The system can output a list of URLs or content item identifiers categorized by topic category and topic category attribute. One of the topic category attributes can be a numerical weight for the topic category. For example, a topic category can be "baseball" and the topic category attribute can be 0.4 indicating the frequency of the topic on the website. The system can retrieve the topic categories and topic category attributes from a separate topic categories database. The topic categories or topic category attributes can be set by the content publisher 115. The topic categories or topic category attributes can be determined by a machine learning algorithm, such as clustering, segmentation, or semantic analysis. The topic categories or topic category attributes can vary based on time. For example, the topic category can include "hockey season" from November to April but also include "hockey playoff season" from April through June.

At act 1120, the system can determine an affinity score of each URL or content item identifier to a user, device, or group of users or devices. The system can generate a map of each URL or content item identifier with URLs or content item identifiers based on the correlation of web property visit data in a single session as described below with FIG. 12. The system can generate a correlation score based on the map of each URL or content item identifier with URLs or content item identifiers correlated by web property data in a single session. The system can also generate the map of URLs or content item identifiers ranked by correlation scores for each URL or content item identifier.

At act 1125, the system can determine an affinity score of each URL or content item identifier to a user, device, or group of users or devices. The system can system can generate a map of users, devices, groups of users or devices to URLs or content item identifiers based on web property visit data. The system can retrieve the context information and attributes of user, device, or group of users or devices, or any other web property visit data from any data storage. The system can generate an affinity score based on the number of visits by user, device, or groups of users or devices for each URL or content item identifier. The system can retrieve the attributes of a user, device, or group of users or devices, or any other web property visit data from any data storage. The system can generate the affinity score based further on context information and attributes associated with the user, device, or group of users or devices. The system can rank the users, devices, or groups of users or devices versus the URLs or content item identifiers based on the affinity scores.

At act 1130, the system can combine the correlation scores and the affinity scores to generate a final score for each of the URLs or content item identifiers. The combination can be of any function of the correlation scores or the affinity scores. For example, the combiner system can take the product of the correlation scores and the affinity scores as the final score. The system can take the weighted sum of the correlation score and the affinity scores as the final score.

At act 1135, the system can rank a combination of the correlation scores and affinity scores to generate rank, parameterized by the click feedback data for each device, user, or group of devices or users. The system can also retrieve click feedback data for each device, user, or group of devices or users from another storage module, such as the database 150. The system can use any number of techniques for ranking. For example, the system can be configured to rank based on a linear regression technique of the correlation scores and the affinity scores, parameterized by click feedback data for each device, user, or group of devices or users. The system can also generate a list of URLs or content item identifiers ranked based on a combination of correlation scores and affinity scores, parameterized by each device, user, or group of devices or users.

At act 1140, the system can store the URLs or content item identifiers to a content publisher storage. The system can also retrieve the list of URLs or content item identifiers categorized by topic categories and topic category attributes. The system can also send the URLs or content item identifiers as content recommendations to the amalgamation engine 320 or any other component in the system. The system can also wait for retrieval of URLs or content item identifiers as content recommendations from the amalgamation engine 320 or any other component in the system.

Figure 12:
FIG. 12 shows an illustrative example of a map generated by an item-to-item collaborative filter of the system or method of recommending content publisher in real-time or near real-time in accordance with an implementation.

FIG. 12 shows an illustrative example of a map generated by an item-to-item collaborative filter of the system or method of recommending content in real-time or near real-time in accordance with an implementation. The item-to-item collaborative filter can be performed on the data processing system 120 or any one or more components of the system 100. The item-to-item collaborative filter can be performed in any of the pipelines 315A-N executing on the system 100 or data processing system 120, or any one or more components of the system 100. The item-to-item collaborative filter can be performed by any of the selection engines 600, 800, or 1000.

The item-to-item collaborative filter can generate a map of each URL or content item identifier with URLs or content item identifiers based on the correlation of web property visit data in a single session. The map can be in the form of a matrix, as shown with the exemplary correlation map 1200. The map can also be in the form of a tree, heap, graph, list, or any data structure. In the exemplary correlation map 1200, the vertical dimension of the matrix can be a list of URLs 1205A-N and the horizontal dimension of the matrix can be a list of correlated URLs (cURLs) 1205A-N. In this example, URL1205A-N corresponds to the same online documents as cURLs 1205A-N. The numbers within the elements of the matrix can indicate the number of times that a user, device, or group of users or devices has visited one of the URLs 1205A-N along with cURLs 1205A-N in a single session. The number of times that a user, device, or group of users or devices has visited a URL or content item identifier can be retrieved from a web property storage, such as storages 310A-N or database 150, or from any one or more components of the system 100. A single session can include the visit data of a user, device, or group of users or devices within a specific period of time. The specific period of time can be specified by a content publisher 115, content provider 125, or any entity associated with the content publisher 115 or content provider 125. In this example, a user, device, or group of users or devices has visited cURL 1205A 2 times, cURL 1205C none, and cURL 1205D 3 times in the same session as URL 1205B. The item-to-item collaborative filter can correlate URL1205B with cURL 1205A and cURL 1205D, but not cURL 1205C because no user, device, or group of users or devices has visited cURL 1205C in a single session as cURL 1205B.

The item-to-item collaborative filter can also generate a correlation score based on the correlation map. The correlation score can be determined using any number of statistical techniques. The correlation score can be determined using correlation coefficient and coefficient of determination. The correlation score can be determined using a cosine similarity between two items spaces. The correlation score can also be determined by the number of users, devices, or groups of users or devices that have visited both URLs or content item identifiers divided by the total number of users, devices, or groups of users or devices.

The item-to-item collaborative filter can also generate a map of URLs or content item identifiers ranked by correlations for each URL or content item identifier. For example, for URL1205B, the item-to-item collaborative filter can generate a list of URLs or content item identifier in descending order cURL 1205D, cURL 1205A, and cURL 1205C, because the number of times that a user, device, or group of users or devices has visited these cURLs in the same session as URL 1205B descends in this order. The list generated can be in the form of a tree, heap, graph, list, or any other data structure.

Figure 13:
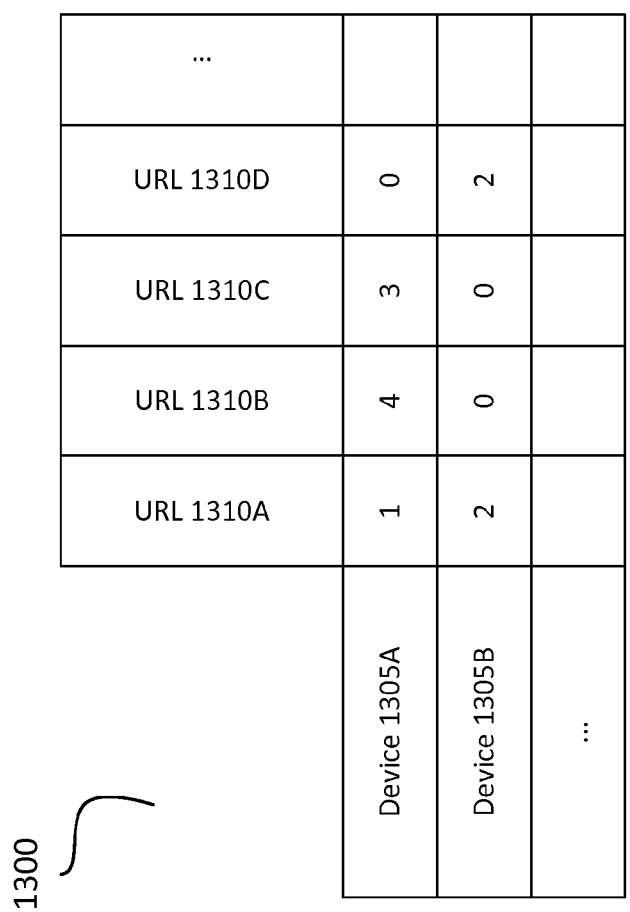
FIG. 13 shows an illustrative example of a device-to-item matrix factorization of the system or method of recommending content in real-time or near real-time in accordance with an implementation.

FIG. 13 shows an illustrative example of a device-to-item matrix factorization of the system or method of recommending content in real-time or near real-time in accordance with an implementation. The device-to-item collaborative filter can be performed on the data processing system 120 or any one or more components of the system 100. The device-to-item collaborative filter can be performed in any of the pipelines 315A-N executing on the system 100 or data processing system 120, or any one or more components of the system 100. The device-to-item collaborative filter can be performed by any of the selection engines 600, 800, or 1000.

The device-to-item matrix factorization can generate a map of each URL or content item identifier with the number of times visited by each user, device, or group of users or devices. An example of a factorized matrix in accordance with an implementation of a device-to-item matrix factorization is shown in FIG. 13. The matrix can be also in the form of a tree, heap, graph, list, or any data structure. In the exemplary factorized matrix 1300, the vertical dimension of the matrix can be a list of devices 1305A-N and the horizontal dimension of the matrix can be a list of URLs 1310A-N. The numbers within each element of the matrix can indicate the number of times each user, device, or group of users or device has visited each URL 1310A-N. In the exemplary factorized matrix 1300, device 1305A has visited URL 1310A 1 time, URL 1310B 4 times, URL 1310C 3 times, and URL 1310D 1 time.

The device-to-item matrix factorization can generate a map further based on context information, topic categories, and attributes of the users, devices, or groups of users or devices. For example, the device-to-item matrix factorization can generate a map of each URL or content item identifier from a topic category with the number of times visited by each user, device, or group of users or devices. The device-to-item matrix factorization can generate a map of each URL or content item identifier from a topic category with the number of times visited by each user, device, or group of users or devices, with the number of times visited scaled by an attribute such as interest in the topic category. The context information can be used, for example, as constraints on how the device-to-item matrix is factorized.

The device-to-item matrix factorization can generate an affinity score based on the number of visits by user, device, or group of users or devices for each URL or content item identifier. The device-to-item matrix factorization can generate an affinity score based on the number of visits by user, device, or group of users or devices for each URL or content item identifier from a topic category. The device-to-item matrix factorization can generate an affinity score based on the number of visits by user, device, or group of users or devices for each URL or content item identifier from a topic category, with the number of times visited scaled by an attribute such as interest in the topic category. The affinity score can be determined using any number of statistical techniques. The affinity score can be determined using an affinity analysis technique, such as market basket analysis. The affinity score can be determined based on taking the inner product of the device, user, or group of users or devices space and the URL or content item identifier space of the device-to-item matrix. The affinity score can be determined based on the cosine similarity between the device, user, or group of user or devices space and the URL or content item identifier space in the embedding space.

The device-to-item matrix factorization can rank the users, devices, or groups of users or devices versus the URLs or content item identifiers based on the affinity scores. For example, for device 1305A, the device-to-item matrix factorization can generate a list of URLs or content item identifiers in descending order URL 1310B, URL 1310C, URL 1310A, and URL 1310D, because the number of times that a device 1305A has visited URL 1310B the most, URL 1310C the second most, URL 1310A the third most, and URL 1310 the least. The list generated can be in the form of a tree, heap, graph, list, or any data structure.

Figure 14:
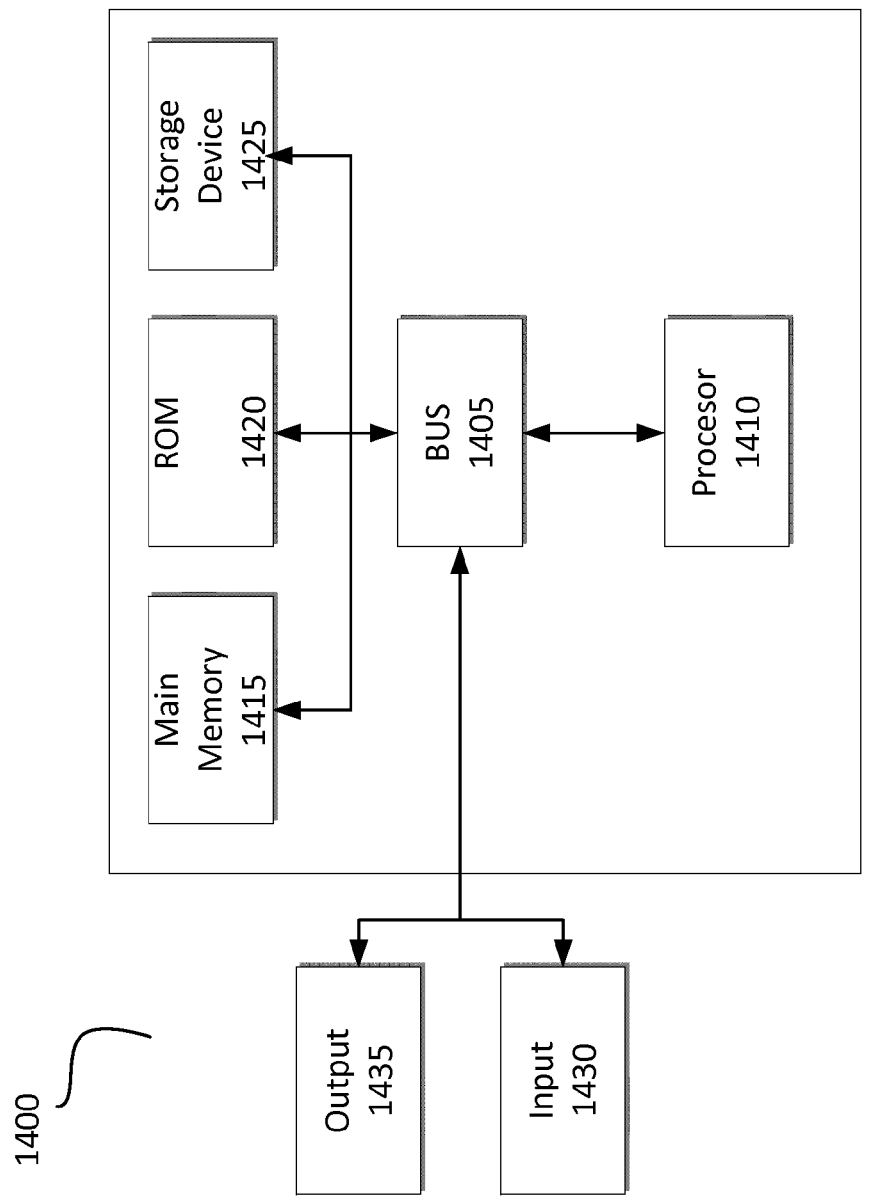
FIG. 14 is a block diagram illustrating a general architecture for a computer system that can be employed to implement various elements of the system shown in FIGS. 1-13, in accordance with an implementation.

FIG. 14 is a block diagram of a computer system 1400 in accordance with an illustrative implementation. The computer system or computing device 1400 can be used to implement the system 130, content provider 125, computing device 110, content publisher 115, data processing system 120, interface 135, matching engine 140, entity engine 145, and database 150. The computing system 1400 includes a bus 1405 or other communication component for communicating information and a processor 1410 or processing circuit coupled to the bus 1405 for processing information. The computing system 1400 can also include one or more processors 1410 or processing circuits coupled to the bus for processing information. The computing system 1400 also includes main memory 1415, such as a random access memory (RAM) or other dynamic storage device, coupled to the bus 1405 for storing information, and instructions to be executed by the processor 1410. Main memory 1415 can also be used for storing position information, temporary variables, or other intermediate information during execution of instructions by the processor 1410. The computing system 1400 can further include a read only memory (ROM) 1420 or other static storage device coupled to the bus 1405 for storing static information and instructions for the processor 1410. A storage device 1425, such as a solid state device, magnetic disk or optical disk, is coupled to the bus 1405 for persistently storing information and instructions.

The computing system 1400 can be coupled via the bus 1405 to a display 1435, such as a liquid crystal display, or active matrix display, for displaying information to a user. An input device 1430, such as a keyboard including alphanumeric and other keys, can be coupled to the bus 1405 for communicating information and command selections to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement can also be employed to execute the instructions contained in main memory 1415. In alternative implementations, hard-wired circuitry can be used in place of or in combination with software instructions to effect illustrative implementations. Thus, implementations are not limited to any specific combination of hardware circuitry and software.

Although an example computing system has been described in FIG. 14, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what can be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated in a single software product or packaged into multiple software products.

References to "or" can be construed as inclusive so that any terms described using "or" can indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method of providing recommendations of real-time content, comprising:
    selecting, by a first selection engine executing on a data processing system, at a first frequency, a first set of content item identifiers from a first database of a content publisher, the first database containing the first set of content item identifiers determined to be provided at a first rate greater than a first predetermined threshold during a first time period;

updating, by an update engine executing on the data processing system, at the first frequency, a first pipeline with the first set of content item identifiers;

selecting, by a second selection engine executing on the data processing system, at a second frequency different from the first frequency, a second set of content item identifiers from a second database of the content publisher, the second database containing the second set of content item identifiers determined to be provided at a second rate greater than a second predetermined threshold during a second time period longer in duration than the first time period;

updating, by the update engine, at the second frequency, a second pipeline with the second set of content item identifiers; and producing, by an amalgamator engine executing on the data processing system, a combined set of content item identifiers comprising a subset of the first set of content item identifiers and a subset of the second set of content item identifiers.

2. The method of claim 1, wherein selecting the second set of content item identifiers comprises:

selecting, by the second selection engine executing on the data processing system, the second set of content item identifiers from the second database of the content publisher, the second database different from the first database, the second frequency greater than the first frequency, the second set of content item identifiers determined to be frequently provided during the second time period based on a comparison of a number of times content items corresponding to the second set of content item identifiers are provided to a number of times content items corresponding to other contents are provided during the second time period.

3. The method of claim 1, wherein selecting the first set of content item identifiers further comprises:

choosing, by a profile filter module executing on the data processing system, a set of premium profiles from a set of profiles; and identifying, by a content collector module executing on the data processing system, the first set of content item identifiers based on the set of premium profiles.

4. The method of claim 1, wherein selecting at least one of the sets of content item identifiers further comprises:

filtering, by a respective content filter module executing on the data processing system, from the respective set of content item identifiers a set of content item identifiers determined to be unsuitable.

5. The method of claim 4, comprising:

filtering, by the respective content filter module executing on the data processing system, from the respective set of content item identifiers a set of content item identifiers determined to be a homepage, a hub page, or a private page.

6. The method of claim 4, wherein selecting at least one of the sets of content item identifiers further comprises:

retrieving, via a respective content analysis engine executing on the data processing system, a respective set of topic categories and a respective set of topic category attributes; and mapping, by the respective content analysis engine executing on the data processing system, each content item identifier to each other content item identifier in the respective set of content item identifiers based on the respective set of topic categories and the respective set of topic category attributes to generate a categorized respective set of content item identifiers.

7. The method of claim 6, further comprising:

correlating, by an item-to-item collaborative filter executing on the data processing system, each content item identifier to each other content item identifier in the categorized respective set of content item identifiers based on a dataset of clicks through each content item identifier to generate a correlation score and a correlated respective set of content item identifiers; and ranking, by the item-to-item collaborative filter, the correlated respective set of content item identifiers based on the correlation score per content item identifier.

8. The method of claim 1, further comprising:

selecting, by a third selection engine executing on the data processing system, at a third frequency different from the first frequency and from the second frequency, a third set of content item identifiers from a third database of the content publisher, the third database containing the set of content item identifiers determined to be provided at a third rate greater than a third predetermined threshold during a third time period longer in duration than the second time period; and updating, by the update engine, a third pipeline, at the third frequency, with the third set of content item identifiers.

9. The method of claim 8, producing the combined set of content item identifiers further comprises:

producing, by the amalgamator engine, the combined set of content item identifiers comprising the subset of the first set of content item identifiers, the subset of the second set of content item identifiers, and a subset of the third set of content item identifiers.

10. The method of claim 9, further comprising:

factorizing, by a device-to-item matrix factorization module executing on the data processing system, each content item identifier in the third set of content item identifiers to a set of devices based on a dataset of clicks, a set of device attributes, and a set of context information to generate an affinity score and a factorized third set of content item identifiers; and ranking, by the device-to-item matrix factorization module, each content item identifier in the factorized third set of content item identifiers based on the affinity score for each content item identifier.

11. The method of claim 10, further comprising:

multiplying, by a combiner module executing on the data processing system, the affinity score and the affinity score per content item identifier in the third set of content item identifiers; and generating, by the combiner module, a final score for each content item identifier in the third set of content item identifiers.

12. The method of claim 11, further comprising:

ranking, by a ranker module executing on the data processing system, each content item identifier in the third set of content item identifiers based on a linear regression of the affinity score and the affinity score parameterized by a click feedback set.

13. The method of claim 8, further comprising:

selecting, by the update engine, at a fourth frequency different from the first frequency, the second frequency, and the third frequency, a fourth set of content item identifiers from a fourth database of the content publisher, the fourth set of content item identifiers determined to be provided at a fourth rate greater than a fourth predetermined threshold during a fourth time period longer in duration than the third time period;

updating, by the update engine, at the fourth frequency, a fourth pipeline with the fourth set of content item identifiers; and producing, by the amalgamator engine, the combined set of content item identifiers comprising the subset of the first set of content item identifiers, the subset of the second set of content item identifiers, the subset of the third set of content item identifiers, and a subset of the fourth set of content item identifiers.

14. A non-transitory computer readable medium storing instructions for providing recommendations of real-time content that upon execution by one or more processors to perform operations, comprising:

selecting, at a first frequency, a first set of content item identifiers from a first database of a content publisher, the first database containing the first set of content item identifiers determined to be provided at a first rate greater than a first predetermined threshold during a first time period;

updating, at the first frequency, a first pipeline with the first set of content item identifiers;

selecting, by a second selection engine executing on the data processing system, at a second frequency different from the first frequency, a second set of content item identifiers from a second database of the content publisher, the second database containing the second set of content item identifiers determined to be provided at a second rate greater than a second predetermined threshold during a second time period longer in duration from the first time period;

updating, at the second frequency, a second pipeline with the second set of content item identifiers; and producing a combined set of content item identifiers comprising a subset of the first set of content item identifiers and a subset of the second set of content item identifiers.

15. The non-transitory computer readable medium of claim 14, wherein the instructions cause the one or more processors to perform operations comprising:

choosing a set of premium profiles from a set of profiles; and identifying the first set of content item identifiers based on the set of premium profiles.

16. The non-transitory computer readable medium of claim 15, wherein the instructions cause the one or more processors to perform operations comprising:

filtering from the respective set of content item identifiers a set of content item identifiers determined to be a homepage, a hub page, or a private page.

17. The non-transitory computer readable medium of claim 14, wherein the instructions cause the one or more processors to perform operations comprising:

retrieving a respective set of topic categories and a respective set of topic category attributes; and mapping each content item identifier to each other content item identifier in the respective set of content item identifiers based on the respective set of topic categories and the respective set of topic category attributes to generate a categorized respective set of content item identifiers.

18. The non-transitory computer readable medium of claim 17, wherein the instructions cause the one or more processors to perform operations comprising:

correlating each content item identifier to each other content item identifier in the categorized respective set of content item identifiers based on a dataset of clicks through each content item identifier to generate a correlation score and a correlated respective set of content item identifiers; and ranking the correlated respective set of content item identifiers based on the correlation score per content item identifier.

19. The non-transitory computer readable medium of claim 14, wherein the instructions cause the one or more processors to perform operations comprising:

selecting, at a third frequency different from the first frequency and from the second frequency, a third set of content item identifiers from a third database of the content publisher, the third database containing the set of content item identifiers determined to be provided at a third rate greater than a third predetermined threshold during a third time period longer in duration than the second time period;

updating a third pipeline, at the third frequency, with the third set of content item identifiers; and producing the combined set of content item identifiers comprising the subset of the first set of content item identifiers, the subset of the second set of content item identifiers, and a subset of the third set of content item identifiers.

20. The non-transitory computer readable medium of claim 19, wherein the instructions cause the one or more processors to perform operations comprising:

selecting, at a fourth frequency different from the first frequency, the second frequency, and the third frequency, a fourth set of content item identifiers from a fourth database of the content publisher, the fourth database containing the fourth set of content item identifiers determined to be provided at a third rate greater than a third predetermined threshold during a fourth time period;

updating, at the fourth frequency, a fourth pipeline with the fourth set of content item identifiers; and producing the combined set of content item identifiers comprising the subset of the first set of content item identifiers, the subset of the second set of content item identifiers, the subset of the third set of content item identifiers, and a subset of the fourth set of content item identifiers.

* * * * *